US011641356B2

(12) United States Patent
Fujii et al.

(10) Patent No.: US 11,641,356 B2
(45) Date of Patent: May 2, 2023

(54) AUTHORIZATION APPARATUS, DATA SERVER AND COMMUNICATION SYSTEM

(71) Applicant: FUJITSU LIMITED, Kawasaki (JP)

(72) Inventors: Yasuki Fujii, Kawasaki (JP); Junichi Suga, Ota (JP); Izuru Sato, Setagaya (JP); Shinya Yamamura, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 17/063,971

(22) Filed: Oct. 6, 2020

(65) Prior Publication Data

US 2021/0120002 A1 Apr. 22, 2021

(30) Foreign Application Priority Data

Oct. 17, 2019 (JP) ............................. JP2019-190026

(51) Int. Cl.
*H04L 29/06* (2006.01)
*H04L 9/40* (2022.01)

(52) U.S. Cl.
CPC ................................. *H04L 63/101* (2013.01)

(58) Field of Classification Search
CPC .................................................... H04L 63/101
See application file for complete search history.

(56) References Cited

U.S. PATENT DOCUMENTS 10,356,080 B2 *  7/2019  Li ............................ H04L 63/10
10,514,854 B2 * 12/2019  Standefer, III .......... G06F 3/067
10,938,821 B2 *  3/2021  Rao ........................ H04L 67/125
11,050,731 B2 *  6/2021  Li ........................... H04W 12/06
11,159,512 B1 * 10/2021  Shi ....................... H04L 63/0815
11,163,879 B2 * 11/2021  Langton ................ G06F 21/567
11,494,482 B1 * 11/2022  Mital ..................... H04L 63/102

(Continued)

FOREIGN PATENT DOCUMENTS

JP    2014-186707 A    10/2014
JP    2015-201097 A    11/2015

(Continued)

OTHER PUBLICATIONS

Maciej Machulak et al. "User-Managed Access (UMA) 2.0 Grant for OAuth 2.0 Authorization", Jan. 7, 2018 (Total 25 pages) URL:https://docs.kantarainitiative.org/uma/wg/rec-oauth-uma-grant-2.0.html.

(Continued)

*Primary Examiner* — Yonas A Bayou
(74) *Attorney, Agent, or Firm* — Fujitsu Patent Center

(57) ABSTRACT

An authorization apparatus includes a memory configured to store attribute information associating an identification information of data and information indicating an attribute of the data, the data being stored in a data server, a processor configured to generate an access token in association with an extraction condition to be used for extracting the data to be obtained by a terminal, and a communicator configured to receive a target access token from the data server, wherein when receiving the target access token, the processor is configured to extract identification information of data pieces satisfying the extraction condition associated with the target access token, and generate a list of identification information of the data to be disclosed to the terminal using a target access token, and the communicator transmits the list to the data server.

7 Claims, 21 Drawing Sheets

(56) References Cited

U.S. PATENT DOCUMENTS

2007/0208714 A1* 9/2007 Ture ................... G06F 21/6227
2015/0350209 A1 12/2015 Tamura
2018/0131684 A1* 5/2018 Standefer, III ........ G06F 3/0622
2020/0092385 A1 3/2020 Ogura et al.

FOREIGN PATENT DOCUMENTS

JP      2015-228067 A      12/2015
JP      2016-115260 A       6/2016
JP      2020-046959 A       3/2020

OTHER PUBLICATIONS

Maciej Machulak et al. "Federated Authorization for User-Managed Access (UMA) 2.0", Jan. 7, 2018 (Total 25 pages) URL:https://docs.kantarainitiative.org/uma/wg/rec-oauth-uma-federated-authz-2.0.html.
EESR—Extended European Search Report dated Feb. 26, 2021 for corresponding European Patent Application No. 20198938.1.
CNOA—Office Action of Chinese Patent Application No. 202011092483.4 dated Sep. 26, 2022 with full English translation.
* Reference cited in the CNOA was previously submitted in the IDS filed on Mar. 25, 2021.
CNOA—Office Action of Chinese Patent Application No. 202011092483.4 dated Feb. 25, 2023 with full English Translation.
JPOA—Office Action of Japanese Patent Application No. 2019-190026 dated Mar. 22, 2023 with Machine Translation.
Ogura et al., "A Proposal of Consent Control in Distributed Data", Proceedings of the 2019 Symposium on Cryptography and Information Security (SCIS2019), Japan 2019, Jan. 15, 2019, 1C2-4, pp. 1-7. [Cited in JPOA dated Mar. 22, 2023 filed herewith].

* cited by examiner

FIG. 6

| OWNER ID | FULL NAME | BIRTHDAY | SEX | ... |
|---|---|---|---|---|
| owner01 | TARO YAMADA | 1/2/1980 | MALE | |
| owner02 | HANAKO FUJITSU | 3/4/1990 | FEMALE | |
| owner03 | JIRO NAKAHARA | 5/6/1990 | MALE | |
| owner04 | ICHIRO KOSUGI | 7/8/1990 | MALE | |
| ... | ... | ... | ... | |

| RESOURCE ID | OWNER ID | USER ID | AGREEMENT STATUS | ... |
|---|---|---|---|---|
| resource01 | owner01 | user01 | AGREED | |
| resource02 | owner02 | user01 | NOT AGREED | |
| resource03 | owner03 | user01 | AGREED | |
| resource04 | owner04 | user01 | NOT AGREED | |
| ... | | | | |

43_2

| RESOURCE ID | OWNER ID | USER ID | AGREEMENT STATUS | ... |
|---|---|---|---|---|
| resource01 | owner01 | user01 | AGREED | |
| resource02 | owner02 | user01 | NOT AGREED | |
| resource03 | owner03 | user01 | AGREED | |
| resource04 | owner04 | user01 | AGREED | |
| ... | | | | |

FIG. 9

| USER ID | RESOURCE TYPE | FILTER INFORMATION | PERMISSION TICKET | ACCESS TOKEN | EXPIRATION DATE AND TIME | ... |
|---|---|---|---|---|---|---|
| user01 | DRIVE DATA | AGES = 20S, 30S | ticket01 | token01 | 12/31/2019 12:00:00 | |
| ... | | | | | | |

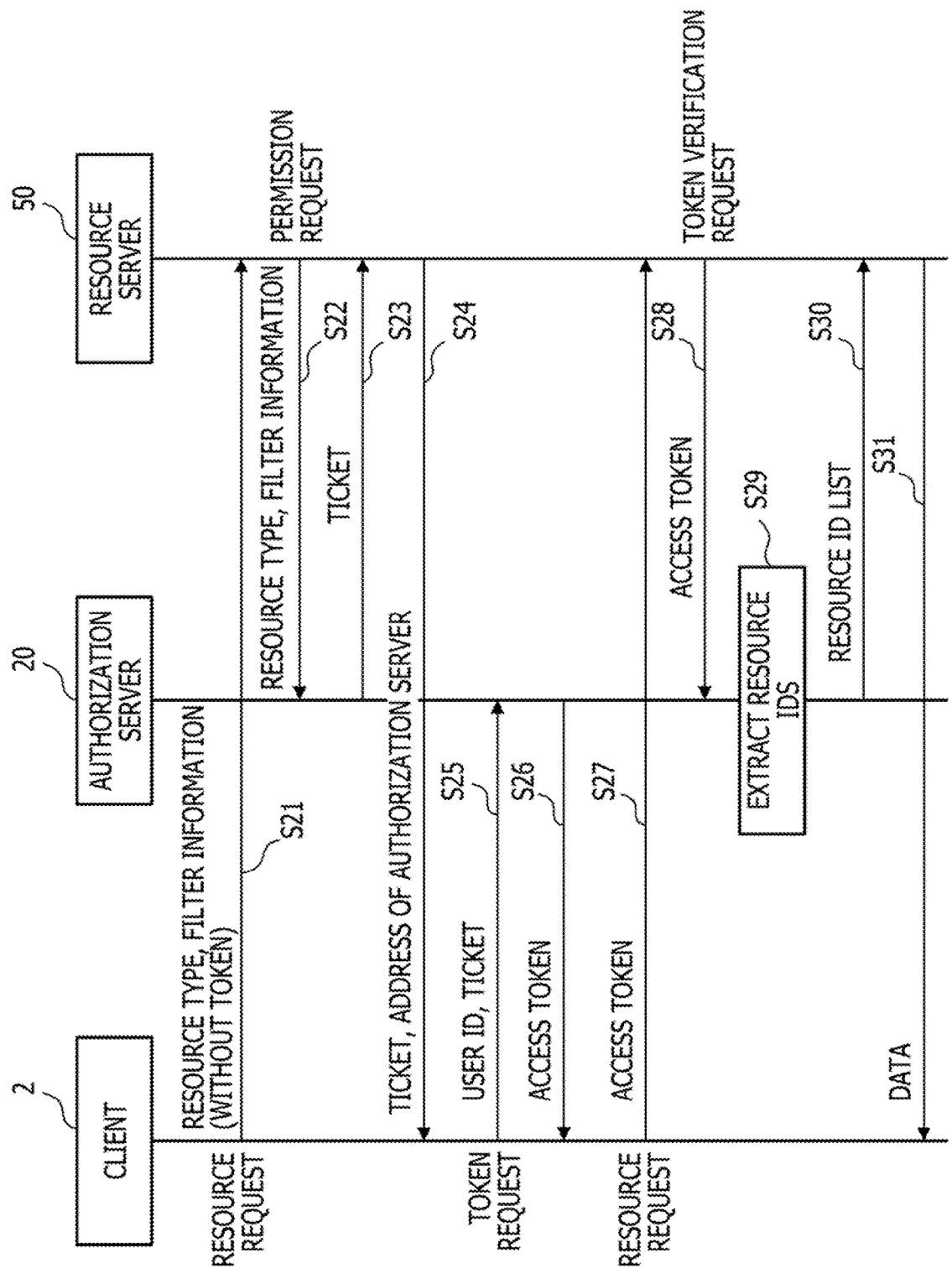

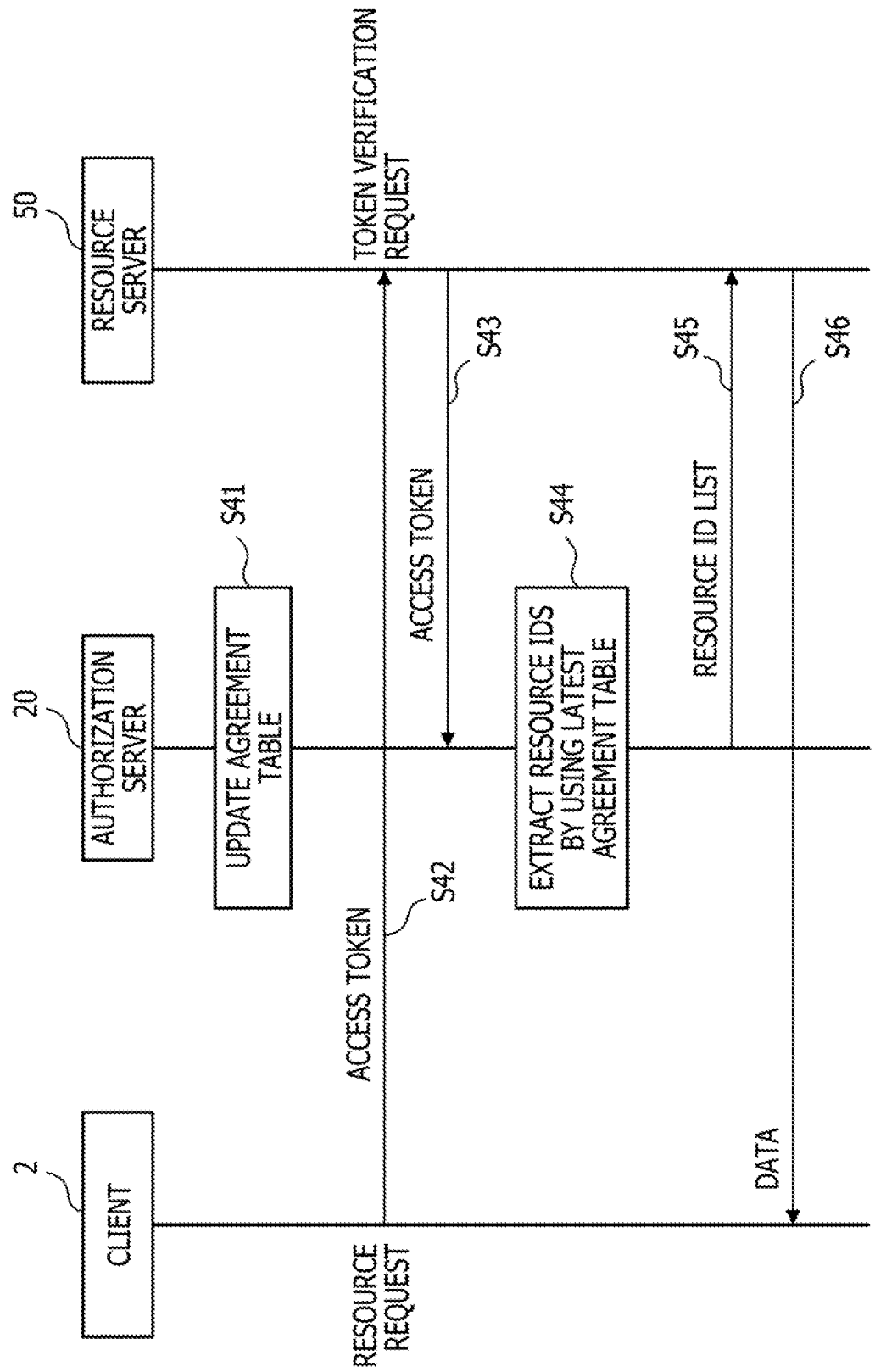

FIG. 14

| FILTER ID | FILTER INFORMATION | ... |
|---|---|---|
| filter01 | CAR TYPE = X | |
| : | | |

71

| RESOURCE ID | CAR TYPE |
|---|---|
| resource 01 | X |
| resource 02 | Y |
| resource 03 | Z |
| resource 04 | X |

| USER ID | RESOURCE TYPE | FILTER INFORMATION | PERMISSION TICKET | ACCESS TOKEN | EXPIRATION DATE AND TIME | FILTER ID | ... |
|---|---|---|---|---|---|---|---|
| user01 | DRIVE DATA | AGES = 20S, 30S | ticket01 | token01 | 12/31/2019 12:00:00 | filter01 | |
| .. | | | | | | | |

AUTHORIZATION APPARATUS, DATA SERVER AND COMMUNICATION SYSTEM

CROSS-REFERENCE TO RELATED APPLICATION

This application is based upon and claims the benefit of priority of the prior Japanese Patent Application No. 2019-190026, filed on Oct. 17, 2019, the entire contents of which are incorporated herein by reference.

FIELD

The embodiments discussed herein are related to an authorization apparatus, a data server and a communication system.

BACKGROUND

In recent years, various kinds of data including personal data are distributed and utilized to pursue the attempt to produce new findings and values. For distribution and utilization of data, access control over the data is performed. Access control such as User-Managed Access (UMA) 2.0 (in "User-Managed Access (UMA) 2.0 Grant for OAuth 2.0 Authorization" ([online], [Searched on Feb. 14, 2019], the Internet, https://docs.kantarainitiative.org/uma/wg/rec-oauth-uma-grant-2.0.html), and "Federated Authorization for User-Managed Access (UMA) 2.0" ([online], [Searched on Feb. 14, 2019], the Internet, <https://docs.kantarainitiative.org/uma/wg/rec-oauth-uma-federated-authz-2.0.html, for example), for example, may also be used by a data owner for controlling access to personal data.

As a related art, a system has been proposed (in Japanese Laid-open Patent Publication No. 2015-228067, for example) that, when it is determined that an access token has been issued based on any of client identifiers associated with a user, issues an access token without asking the user to confirm authorization. A system has also been proposed (in Japanese Laid-open Patent Publication No. 2016-115260, for example) that preliminarily registers destination information pieces of a plurality of mediation devices corresponding to a plurality of resource servers with different performances for the same resource so that a client may select one of the destination information pieces, A system has also been proposed (in Japanese Laid-open Patent Publication No. 2015-201097, for example) that, when a menu including all of attributes set to be permitted exists in an access request designating a Web information menu, transmits a menu screen for accessing personal information to a user terminal. A system for confirming a processing result of a whole workflow in which a plurality of services cooperatively operates on a cloud platform service has also been proposed (in Japanese Laid-open Patent Publication No. 2014-186707, for example).

SUMMARY

According to an aspect of the embodiments, an authorization apparatus includes a memory configured to store attribute information associating an identification information of data and information indicating an attribute of the data, the data being stored in a data server, a processor configured to generate an access token in association with an extraction condition to be used for extracting the data to be obtained by a terminal, and a communicator configured to receive a target access token from the data server, wherein when receiving the target access token, the processor is configured to extract identification information of data pieces satisfying the extraction condition associated with the target access token, and generate a list of identification information of the data to be disclosed to the terminal using a target access token, and the communicator transmits the list to the data server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of an owner table;

FIG. 8 is a diagram illustrating an example of an agreement table;

FIG. 9 is a diagram illustrating an example of a request table;

FIG. 10 is a sequence diagram illustrating an example of a communication according to a first embodiment;

FIG. 11 is a sequence diagram illustrating an example of a communication according to the first embodiment;

FIG. 14 is a diagram illustrating examples of a filter table and attribute information;

FIG. 16 is a diagram illustrating an example of a request table;

DESCRIPTION OF EMBODIMENTS

In the rerated art, for access control, a client apparatus that attempts to obtain data pieces often generates a data obtaining request for each of the data pieces to be accessed. In this case, an authorization server also determines whether the data pieces may be obtained or not for each of the data pieces and issues access tokens. A data server that holds the data pieces also communicates with the client apparatus and the authorization server for each of the data obtaining requests. As a result, in order to obtain a plurality of data pieces, a large processing load is imposed on all of the authorization server, the data server and the client. This problem is not solved even by the methods described as related art. For example, even in a system in which confirmation of the authorization to a user may be omitted for issuing access tokens, an access token is to be issued for each data piece. Therefore, in order to obtain a plurality of data pieces, an increased processing load is imposed on the apparatuses in a network including an authorization server and so on.

According to one aspect, it is an object of the embodiments to reduce a processing load occurring for access to a plurality of data pieces.

Figure 1:
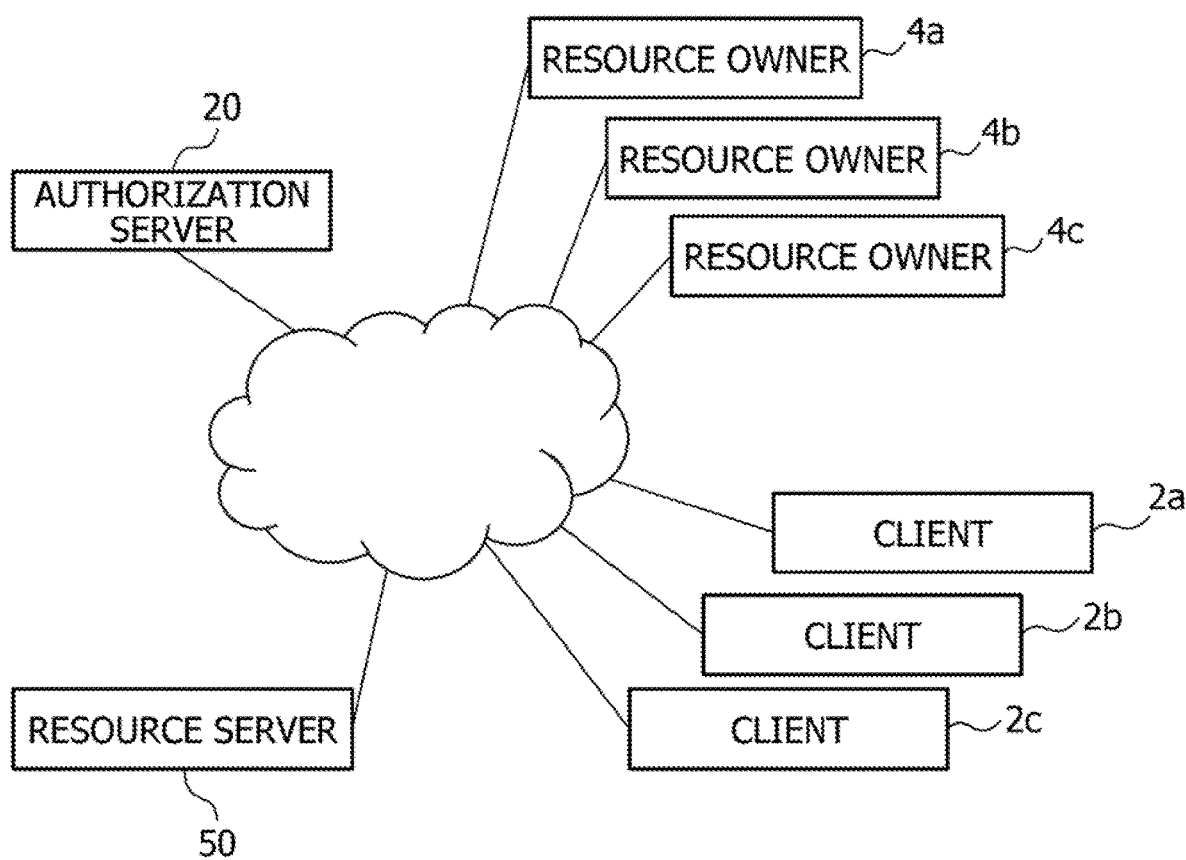
FIG. 1 is a diagram illustrating an example of a network.

FIG. 1 is a diagram illustrating an example of a network. Clients 2 (2a to 2c), resource owners 4 (4a to 4c), an authorization server 20, and a resource server 50 are coupled to a network. FIG. 1 is an example of the network and may be changed in accordance with the implementation. For example, the numbers of the clients 2 and the resource owners 4 coupled to the network may be changed arbitrarily in accordance with the implementation.

The resource server 50 is a server that stores data pieces (resources) and is also called a "data server". The resource server 50 stores a data piece in association with an identification information piece by which the data piece is identified. The data piece may be an arbitrary kind of data and may be an information piece related to an individual, for example. The authorization server 20 determines whether an access to a data piece by the client 2 is authorized and identifies a data piece that may be provided to the client 2 authorized to access the resource server 50, for example. It is assumed that, in order to identify a data piece that may be provided to the client 2, the authorization server 20 holds attribute information on the data piece in association with the identification information piece on the data piece. The attribute information includes information regarding the possibility of the disclosure of a data piece notified from the resource owner 4, for example.

The client 2 is an apparatus that attempts to obtain a data piece from the resource server 50 and is also called a "terminal". The client 2 may be a terminal of a company that provides a service and sets a provision condition of a service by using the obtained data pieces, for example. The resource owner 4 is a terminal to be used by a provider of a data piece stored in the resource server 50. The resource owner 4 may properly set, for the authorization server 20, a disclosure destination of a data piece and the possibility of the disclosure. For example, when personal data are stored in the resource server 50, the provider of the personal data may set the possibility of the disclosure of the personal data by using the terminal illustrated as the resource owner 4.

Figure 2:
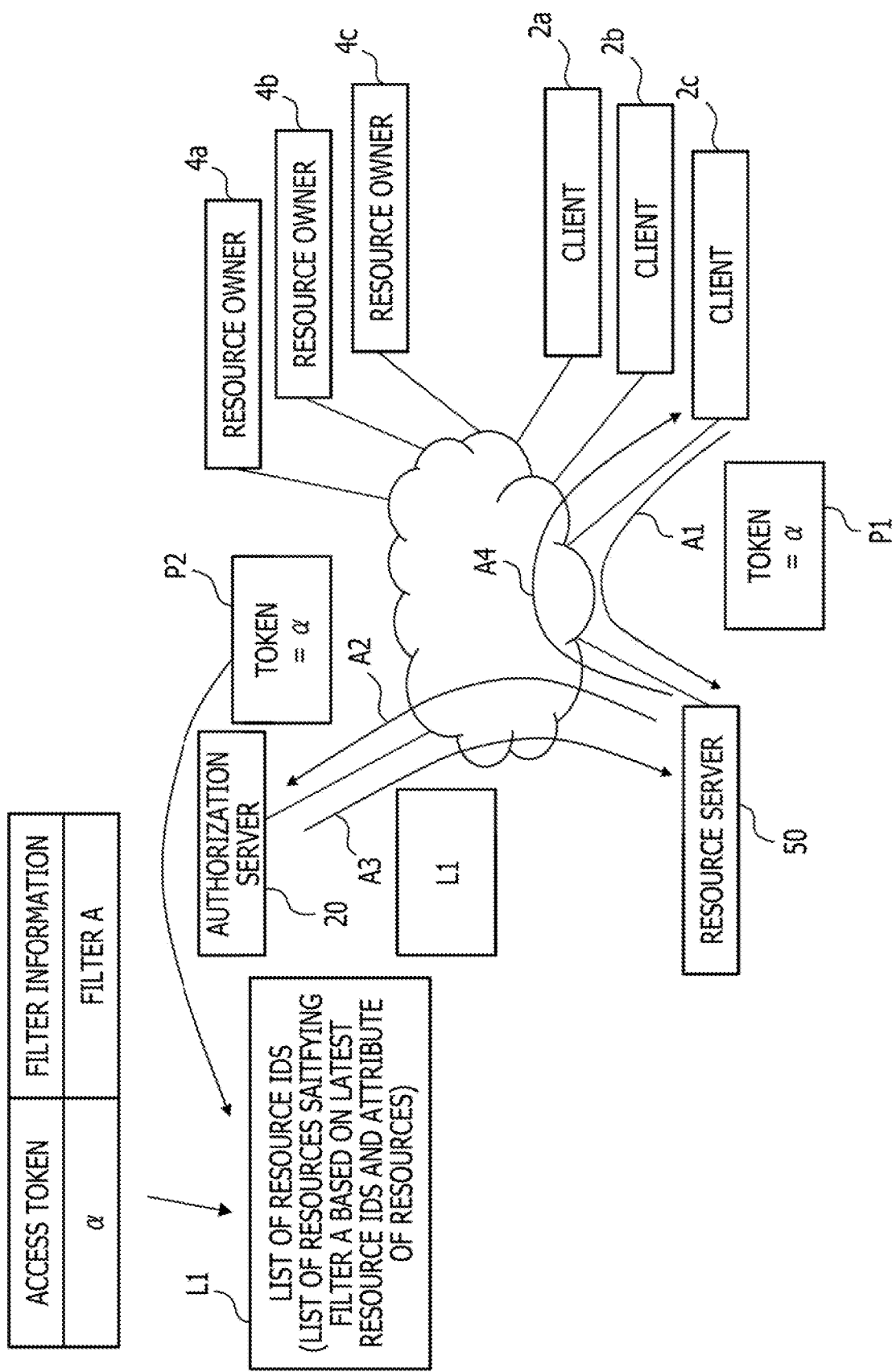
FIG. 2 is a diagram illustrating an example of a communication method according to an embodiment.

FIG. 2 is a diagram illustrating an example of a communication method according to an embodiment. An example of a communication to be performed in the network illustrated in FIG. 1 will be described with reference to FIG. 2. It is assumed that, in a method according to an embodiment, the client 2 that attempts to access the resource server 50 is attempting to obtain from the resource server 50 a plurality of data pieces satisfying an extraction condition (filter information) usable for extraction of data pieces. For example, the example in FIG. 2 assumes that the client 2c is attempting to obtain a plurality of data pieces satisfying filter information called a "filter A". The client 2 may notify the filter information when accessing the resource server 50, for example.

It is assumed that the authorization server 20 may obtain the filter information to be used by the client 2 attempting to access the resource server 50, For example, the resource server 50 may notify filter information notified from the client 2 to the authorization server 20. For authorizing the client 2 to access the resource server 50, the authorization server 20 generates an access token usable by the client 2 in association with the filter information and notifies the access token to the client 2. In the example in FIG. 2, the authorization server 20 generates a as an access token usable by the client 2c and stores it in association with the filter information=filter A. The authorization server 20 notifies the access token=a to the client 2c.

The client 2c requests data pieces by transmitting a packet P1 including the access token a to the resource server 50 (arrow A1). The resource server 50 transmits a packet P2 including the access token to the authorization server 20 (arrow A2).

When the authorization server 20 receives the access token=a from the resource server 50, the authorization server 20 generates a list L1 of identification information pieces (IDs) of data pieces (resources) satisfying the filter A associated with the access token=a. In order to generate the list L1, the authorization server 20 performs the extraction processing with the filter A based on identification information pieces (resource identifiers (IDs)) of the latest data pieces and the latest attributes of the data pieces. The authorization server 20 transmits the generated list L1 to the resource server 50 (arrow A3) as a response to the communication indicated by the arrow A2.

The resource server 50 extracts, from the data pieces stored therein, data pieces with identification information pieces recorded in the list L1 received from the authorization server 20. The resource server 50 transmits the extracted data pieces to the client 2c (arrow A4) as a response to the communication indicated by the arrow A1. Thus, the client 2c may collectively obtain, from the resource server 50, the data pieces satisfying the filter A that is the extraction condition for the data pieces attempted to obtain by the client 2c.

As described with reference to FIGS. 1 and 2, the client 2 may collectively obtain, from the resource server 50, data pieces satisfying filter information. Thus, the processing loads on all of the client 2, the authorization server 20 and the resource server 50 may be reduced, compared with the system in which the access token issuing and authentication processing is performed the number of times equal to the number of data pieces notified to the client 2.

<Apparatus Configuration>

Figure 3:
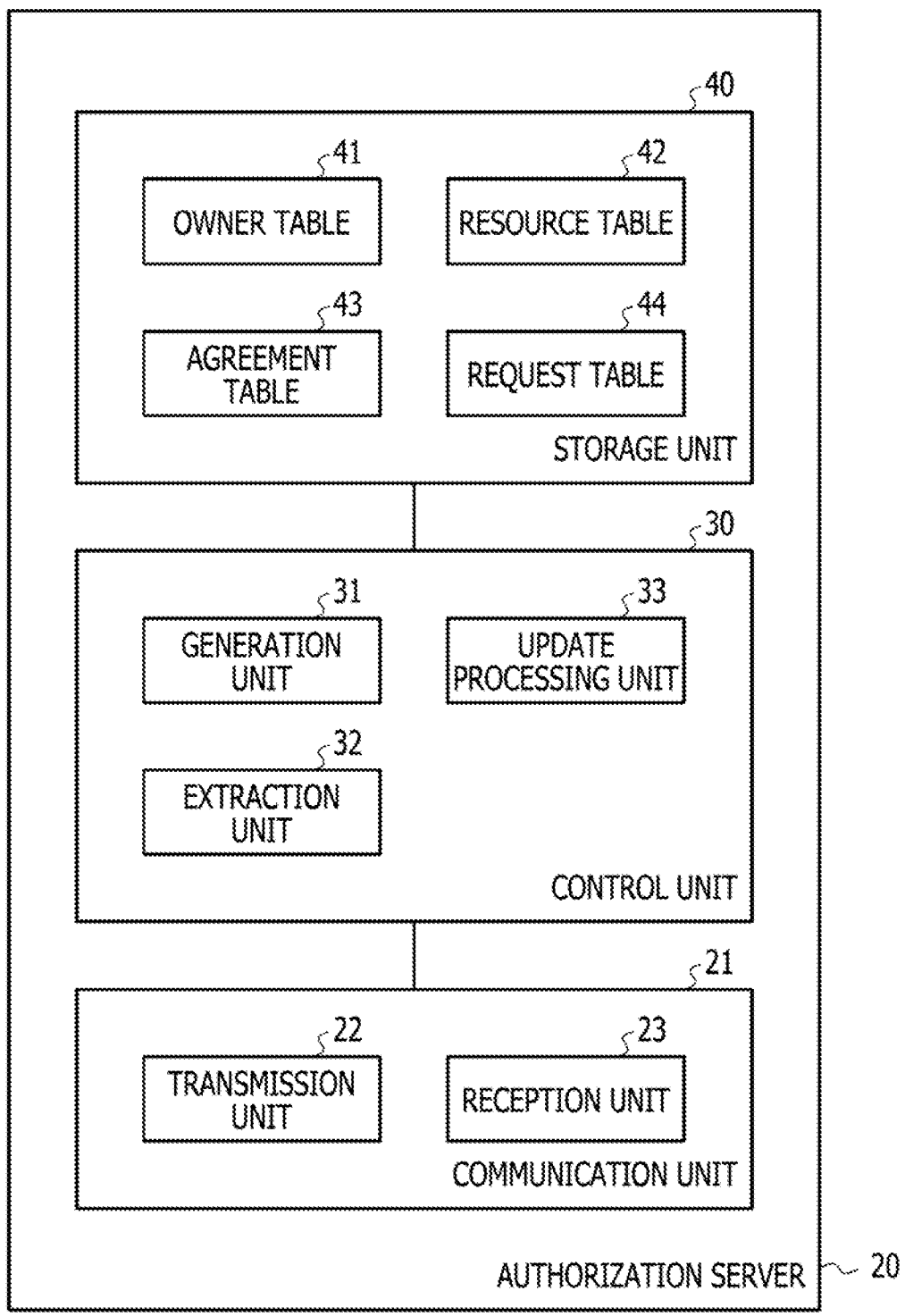
FIG. 3 is a diagram illustrating an example of a configuration of an authorization server.

FIG. 3 is a diagram illustrating an example of a configuration of the authorization sewer 20. The authorization server 20 includes a communication unit 21, a control unit 30, and a storage unit 40. The communication unit 21 includes a transmission unit 22 and a reception unit 23. The transmission unit 22 transmits a packet to other apparatuses such as the client 2, the resource owner 4 and the resource server 50. The reception unit 23 receives a packet from other apparatuses such as the client 2, the resource owner 4 and the resource server 50. Thus, the control unit 30 may properly exchange data pieces with the client 2 and the resource server 50 through the transmission unit 22 and the reception unit 23.

The storage unit 40 stores attribute information in which an identification information piece of a resource (data piece) held by the resource server 50 and information indicating an attribute of the resource are associated. As an example, a case in which the attribute information is divided into an owner table 41, a resource table 42, an agreement table 43 and a request table 44 will be described below. The owner table 41 stores information on a provision source of a resource. When personal data are held in the resource server 50, the owner table 41 stores information on a provider of the personal data. The resource table 42 stores an identification information piece (resource ID) of a data piece for each kind of resource. The agreement table 43 stores information on a provision destination agreed by a provision source of a resource to provide the resource. The request table 44 stores information to be used for processing a request to obtain a resource by using an access token. Examples of the owner table 41, the resource table 42, the agreement table 43, and the request table 44 will be described below.

The control unit 30 includes a generation unit 31, an extraction unit 32, and an update processing unit 33. The update processing unit 33 performs update processing in response to an update request for information stored in the storage unit 40.

The generation unit 31 generates an access token for the client 2 authorized to access resources stored in the resource server 50. In this case, the generation unit 31 generates an access token in association with filter information (extraction condition) to be used for extracting resources to be obtained by the client 2. The generation unit 31 also generates ticket information to be used for accessing the authorization server 20 by the client 2 attempting to obtain the resources.

When an access token to be processed is notified from the resource server 50, the extraction unit 32 extracts identification information pieces of resources satisfying filter information associated with the access token to be processed by using information stored in the storage unit 40. The extraction unit 32 generates a list of the extracted identification information pieces. The list generated by the extraction unit 32 is used as a list of identification information pieces of resources to be disclosed to the client 2 that has transmitted the access token to be processed.

Figure 4:
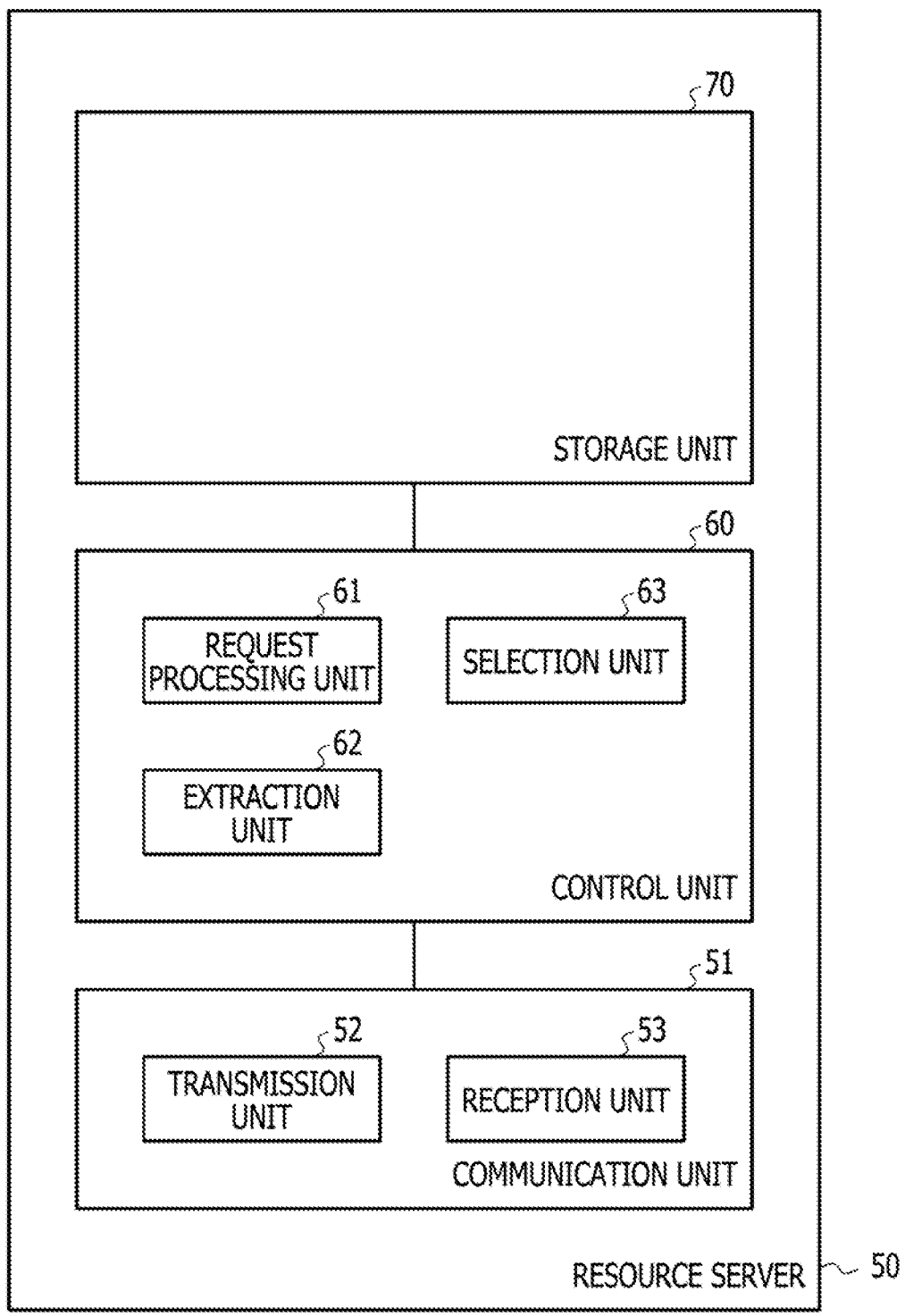
FIG. 4 is a diagram illustrating an example of a configuration of a resource server.

FIG. 4 is a diagram illustrating an example of a configuration of the resource server 50. The resource server 50 includes a communication unit 51, a control unit 60, and a storage unit 70. The communication unit 51 includes a transmission unit 52 and a reception unit 53. The transmission unit 52 transmits a packet to other apparatuses such as the client 2, the resource owner 4 and the authorization server 20. The reception unit 53 receives a packet from other apparatuses such as the client 2, the resource owner 4 and the authorization server 20. Thus, the control unit 60 may properly exchange data with the client 2 and the authorization server 20 through the transmission unit 52 and the reception unit 53, The storage unit 70 stores a data piece (resource) in association with an identification information piece.

The control unit 60 has a request processing unit 61 and an extraction unit 62 and may optionally have a selection unit 63. The request processing unit 61 requests the authorization server 20 to verify an access token received from the client 2. The request processing unit 61 may also request the authorization server 20 to issue ticket information to be notified to the client 2. The extraction unit 62 extracts resources in association with identification information pieces included in the list notified from the authorization server 20 as resources to be provided to the client 2. The selection unit 63 selects targets to undergo the extraction processing in the resource server 50 from filter information notified by the client 2 to the resource server 50. When targets to undergo the extraction processing in the resource server 50 are selected, the extraction unit 62 also performs the extraction processing in the resource server 50.

Figure 5:
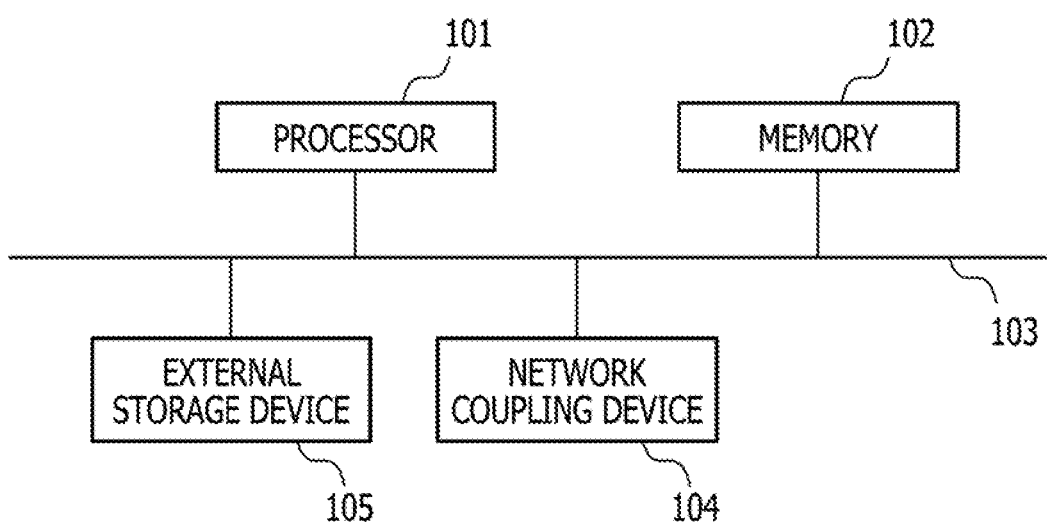
FIG. 5 is a diagram illustrating an example of a hardware configuration.

FIG. 5 is a diagram illustrating an example of a hardware configuration. Both of the authorization server 20 and the resource server 50 include a processor 101, a memory 102, a bus 103, a network coupling device 104 and an external storage device 105. The processor 101 is an arbitrary processing circuit and may be a central processing unit (CPU), for example. The processor 101 uses the memory 102 as a working memory to execute a program stored in the memory 102 or the external storage device 105, thereby executing various processes. The memory 102 includes a random-access memory (RAM) and a nonvolatile memory such as a read-only memory (ROM). The memory 102 stores the program and data to be used for the processes to be executed by the processor 101. The external storage device 105 stores programs, data, and the like and properly provides the stored information to the processor 101 or the like. The network coupling device 104 is used to communicate with another device via the network. The bus 103 couples the processor 101, the memory 102, the network coupling device 104, and the external storage device 105 to each other so that the processor 101, the memory 102, the network coupling device 104, and the external storage device 105 may receive and output data from and to each other.

In the authorization server 20, the control unit 30 is implemented by the processor 101, The communication unit 21 is implemented by the network coupling device 104. The storage unit 40 is implemented by the memory 102 and the external storage device 105. In the resource server 50, the control unit 60 is implemented by the processor 101. The communication unit 51 is implemented by the network coupling device 104. The storage unit 70 is implemented by the memory 102 and the external storage device 105. Both of the authorization server 20 and the resource server 50 may be implemented as a computer, a server apparatus or the like.

<Examples of Attribute Information>

With reference to FIGS. 6 to 9, examples of attribute information of data pieces (resources) will be described below. The following description assumes, as an example, that the resource server 50 is managed by an automobile company and stores, as resources, data pieces (drive data pieces) regarding driving of automobiles sold or lent by the automobile company. The drive data pieces may be properly provided to the resource server 50 from devices (not illustrated) such as drive recorders mounted over automobiles. It is assumed that the client 2 identified by user01 is an insurance company that handles car insurances and is attempting to obtain drive data pieces of drivers satisfying a condition such as age and sex. It is assumed that the authorization server 20 stores information such as the age and sex of individual drivers whose drive data pieces are recorded in the resource server 50, an agreement status with respect to disclosure of the drive data pieces of the drivers and so on.

FIG. 6 is a diagram illustrating an example of the owner table 41. The owner table 41 stores, in association with an owner ID, an information piece on a provider identified by the owner ID. In the example in FIG. 6, the name, birthday, and sex are recorded as the information pieces on the provider of a resource. For example, as the information pieces on a provider with owner ID=owner01, name=Taro Yamada, birthday=Jan. 2, 1980, sex=male are recorded. Though the example in FIG. 6 includes information pieces regarding four providers with owner IDs=owner01 to owner04, the owner table 41 may record information pieces on an arbitrary number of providers.

Figure 7:
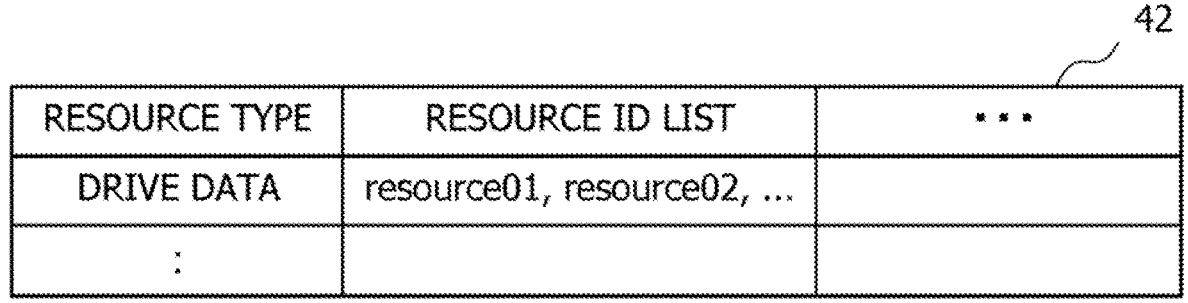
FIG. 7 is a diagram illustrating an example of a resource table.

FIG. 7 is a diagram illustrating an example of the resource table 42. The resource table 42 stores identification information pieces of individual resources held in the resource server 50 in association with resource types. The resource type is an arbitrary category name used for categorizing data pieces to be stored as resources. A resource associated with resource type=drive data is information indicating a driving evaluation, driving characteristic or the like of automobile driving performed by a provider of the resource. Though the example in FIG. 7 includes resource01 and resource02 as resource IDs associated with resource type=drive data, an arbitrary number of resource IDs may be associated with each resource type. The following description assumes that resource01 to resource04 are recorded in association with resource type=drive data, FIG. 8 is a diagram illustrating an example of the agreement table 43, The agreement table 43 includes a resource ID, an owner ID, a user ID, and an agreement status. For each combination of a resource and the client 2 attempting to access the resource, the agreement table 43 stores whether the provider who has provided the resource has agreed about the provision of the resource. In other words, for example, each entry in the agreement table 43 indicates whether a provider identified by an owner ID has agreed about provision of a resource identified by a resource ID in the entry to the client 2 identified by a user ID in the entry. For example, the first entry of an agreement table 43_1 indicates that a provider with owner ID=owner01 has agreed about provision of a resource with resource ID=resource01 to the client 2 identified by user01.

By searching through the owner table 41 by using an owner ID in the agreement table 43 as a key, an information piece on the provider of a resource to be processed may be identified. For example, it is assumed that the first entry of the owner table 41 and the first entry of the agreement table 43_1 are used. The information piece may be identified that Taro Yamada who is a male born on Jan. 2, 1980 has agreed about provision of a resource with resource ID=resource01 to the client 2 identified by user01. In the same manner, also for a combination of another resource and the client 2, the agreement status of a provider of the resource may be identified from the agreement table 43. By combining the agreement table 43 and the owner table 41, which provider has agreed about provision of a resource may be identified.

A provider of a resource may properly update the agreement status by accessing the authorization server 20 from a terminal indicated as the resource owner 4. For example, in the agreement table 43_1, owner04 (Ichiro Kosugi in FIG. 6) who is a provider of a resource with resource ID=resource04 has not agreed about provision of the resource identified by resource04 to the client 2 identified by user01. It is assumed that owner04 has then notified to the authorization server 20 of the agreement about provision of the resource identified by resource04 to the client 2 identified by user01. The update processing unit 33 in the authorization server 20 updates the agreement table 43_1 to the agreement table 43_2. Thus, after the update to the agreement table 43_2, the resource identified by resource04 may be provided to the client 2 in response to a request by the client 2 identified by user01. Like the agreement table 43, the information in the owner table 41 and the resource table 42 may be updated in accordance with registration of a new resource or attribute information.

FIG. 9 is a diagram illustrating an example of the request table 44. The request table 44 stores a user ID, a resource type, filter information, a permission ticket, an access token and an expiration date and time in association. The user ID is an identification information piece by which the client 2 is identified. The resource type is information indicating a type of resource. The filter information is an extraction condition to be used for extracting a resource that the client 2 attempts to obtain. For example, when ages=20s and 30s are set in the filter information, resources provided by providers in their 20s and 30s are extracted from resources categorized to the resource type that the client 2 attempts to obtains. The permission ticket (ticket) is ticket information to be used for requesting to issue an access token from the client 2 to the authorization server 20. The access token is an access token issued to the client 2 identified by the user ID included in the entry. The expiration date and time is an expiration date and time of the access token.

In the example in FIG. 9, the client 2 identified by user01 sets filter information for obtaining resources provided by providers in their 20s and 30s in the resources categorized in resource type drive data. In order for the client 2 identified by user01 to request issuance of an access token, a permission ticket ticket01 is used, An access token token01 that is valid until 12:00:00 on Dec. 31, 2019 is issued to the client 2 identified by user01.

First Embodiment

An example of processing to be performed when the client 2 being a terminal of an insurance company obtains drive data pieces of drivers in their 20s and 30s from the resource server 50 that holds drive data pieces will be described below. The following description assumes that user ID=user01 is assigned to the client 2. According to a first embodiment, the resource server 50 may not include the selection unit 63.

FIG. 10 is a sequence diagram illustrating an example of a communication according to the first embodiment. It is assumed that, at the beginning of the processing in FIG. 10, information regarding the client 2 is not included in the request table 44 held by the authorization server 20.

The client 2 to which an access token has not been issued transmits a resource request including a resource type and filter information and not including an access token to the resource server 50 (step S21). The resource type in the resource request represents a type of resources to be obtained by the client 2. The filter information included in the resource request represents a condition to be used for processing of extracting resources that the client 2 attempts to obtain, Therefore, for example, in step S21, a resource request including information including resource type=drive data and filter information=20s and 30s is transmitted.

The resource request is transmitted in an arbitrary form usable for communication between the client 2 and the resource server 50. For example, the resource request may be a Hypertext Transfer Protocol (HTTP) request having filter information as a request Uniform Resource Identifier (URI). Therefore, for example, when a Uniform Resource Locator (URL) of the resource server 50 is http://abc.com, an HTTP request as follows may be used as the resource request in step S21.

http://abc.com/get?resource=drivedata&filter=((age eq 20s)and(age eq 30s))

Further, the resource request may be an HTTP request in a form including a storage location of resources to be obtained as follows.

http://abc.com/get/drivedata/driver20and30

It is assumed that, when an HTTP request in a form including a storage location of resources is used, the client 2 may recognize in advance a storage condition of the resource in the resource server 50.

The request processing unit 61 in the resource server 50 obtains the resource request transmitted from the client 2 through the reception unit 53. The request processing unit 61 generates a permission request for obtaining a permission ticket (ticket) to be used by the transmission source of the resource request. The permission request includes the resource type and the filter information included in the resource request transmitted from the client 2. The request processing unit 61 transmits the permission request to the authorization server 20 through the transmission unit 52 (step S22).

The generation unit 31 in the authorization server 20 obtains the permission request through the reception unit 23. The generation unit 31 generates a ticket in association with the combination of the resource type and the filter information included in the permission request. The ticket is information in an arbitrary form by which a combination of a resource type and filter information associated with the ticket may be uniquely identified. The generation unit 31 records the generated ticket in the request table 44 along with the corresponding combination of the resource type and the filter information. For example, when a ticket ticket01 is generated, the following information is recorded in the request table 44.

resource type=drive data,
filter information=20s, 30s, and
ticket=ticket01.

The generation unit 31 transmits the generated ticket to the resource server 50 as a response message to the permission request (step S23).

The request processing unit 61 in the resource server 50 includes the ticket notified from the authorization server 20 and address information on the authorization server 20 in the response message to the resource request. The request processing unit 61 transmits the generated response message to the client 2 (step S24).

The client 2 transmits to the authorization server 20 a token request including the ticket notified from the resource server 50 and the user ID assigned to the client 2 (step S25). In this example, it is assumed that the token request is transmitted which includes:

ticket=ticket01, and
user ID=user01.

The generation unit 31 in the authorization server 20 obtains the token request through the reception unit 23. The generation unit 31 searches through the request table 44 by using the ticket included in the token request as a key. At this point in time, a combination of resource type=drive data and filter information=20s, 30s is recorded in the request table 44 in association with the information indicating ticket=ticket01. When an entry including the ticket included in the token request is identified in the request table 44, the generation unit 31 generates an access token for a request source of the token request. The generation unit 31 adds the user ID of the request source of the token request and the information on the access token to the identified entry. For example, it is assumed that the generation unit 31 has issued an access token token01 that is valid until 12:00:00 on Dec. 31, 2019 to the client 2. The generation unit 31 updates the entry related to the client 2 as illustrated in FIG. 9. The generation unit 31 transmits the generated access token to the client 2 by including the access token in a response to the token request (step S26).

The client 2 having obtained the access token transmits the access token to the resource server 50 to obtain the resource (step S27). The request processing unit 61 in the resource server 50 generates a token verification request including the access token received from the client 2 and transmits it to the authorization server 20 (step S28). The token verification request is a message for requesting to verify whether the access token in the token verification request is valid.

The extraction unit 32 in the authorization server 20 searches through the request table 44 (FIG. 9) by using the access token included in the token verification request as a key. When an entry including the access token to be verified hits, the extraction unit 32 determines whether it is beyond the expiration date and time in the entry. When it is not beyond the expiration date and time, the extraction unit 32 determines that the access token is valid. The extraction unit 32 extracts the resource ID of a resource satisfying the filter information associated with the valid access token (step S29). The extraction unit 32 records the extracted resource ID in a resource ID list.

Details of the processing of extracting a resource ID and the processing of generating a resource ID list when the access token token01 is determined as valid will be described below. It is assumed that, at the point in time when the access token token01 is determined as valid, the authorization server 20 holds the information illustrated in FIGS. 6, 7, and 9 and the agreement table 43_1 in FIG. 8 as attribute information. It is assumed that the point in time when the access token is determined as valid is Apr. 14 in 2019.

By using the request table 44 (FIG. 9), the extraction unit 32 recognizes that the resource type associated with token01 is drive data and the filter information is "ages=20s, 30s". First, the extraction unit 32 identifies resource IDs given to drive data pieces held by the resource server 50 by searching through the resource table 42 (FIG. 7) by using the resource type as a key. It is assumed that four IDs including resource01, resource02, resource03, and resource04 are identified as resource IDs given to drive data pieces.

The extraction unit 32 uses the information in the agreement table 43_1 (FIG. 8) and the owner table 41 (FIG. 6) to extract IDs associated with data pieces satisfying the filter information based on the identified resource IDs. The extraction unit 32 searches through the agreement table 43_1 by using resource ID=resource01 as a key and recognizes that owner ID=owner01 is associated with resource ID=resource01. Next, the extraction unit 32 searches through the owner table 41 by using, as a key, owner ID=owner01 corresponding to resource ID=resource01 and determines whether the information piece in a hit entry satisfies the filter information. The entry including owner ID=owner01 includes information indicating birthday=1/2/1980. Therefore, at the point in time of the resource search, the driver having performed the driving recorded as drive data identified by resource ID=resource01 is 39 years old. Accordingly, the extraction unit 32 determines that the information piece with resource ID=resource01 satisfies the filter information. The extraction unit 32 performs the same processing on the other resource IDs. At the point in time of the resource search, all of the drivers having performed the driving recorded as drive data identified by resource IDs=resource02 to resource04 are 29 years old. Therefore, the extraction unit 32 determines that the information pieces with resource IDs=resource01 to resourced satisfy the filter information.

Next, with reference to the agreement table 43_1 (FIG. 8), the extraction unit 32 determines whether the owners who provide the resources satisfying the filter information agree about the disclosure of the resources. For example, the extraction unit 32 determines the agreement status in the entry combined with the user ID (user01) of the client 2 for each resource ID by which a resource satisfying the filter information is identified. Referring to the first entry in the agreement table 43_1, provision of resource01 to the client 2 with user ID user01 has been agreed. Accordingly, the extraction unit 32 includes resource01 in a resource ID list. Referring to the third entry in the agreement table 43_1, provision of resource03 to the client 2 with user ID=user01 has been agreed. On the other hand, referring to the entries corresponding to resource02 and resource04 in the agreement table 43_1, provision of both resource02 and resource04 to the client 2 with user ID=user01 has not been agreed. Accordingly, the extraction unit 32 includes resource03 in the resource ID list but does not include resource02 and resource04 in the resource ID list. In other words, for example, even when a resource that has not been agreed about its disclosure by the owner satisfies filter information, the extraction unit 32 excludes the corresponding resource from resources to be provided to the client 2.

In step S30 in FIG. 10, the extraction unit 32 transmits the generated resource ID list to the resource server 50. It is assumed that resource01 and resource03 are recorded in the resource ID list.

When the extraction unit 62 in the resource server 50 obtains the resource ID list received from the authorization server 20, the extraction unit 62 extracts resources associated with the resource IDs in the resource ID list. The extraction unit 62 collectively transmits the extracted resources (data pieces) to the client 2 (step S31), In this example, the extraction unit 62 extracts the drive data piece identified by resource01 and the drive data piece identified by resource03. The extraction unit 62 collectively transmits the extracted data pieces to the client 2.

Therefore, when a plurality of data pieces satisfying the filter information is held in the resource server 50, the client 2 may collectively obtain the data pieces satisfying the filter information. Because an access token is not issued to each data piece satisfying filter information, one access token is used to collectively obtain a plurality of data pieces. Thus, in the system according to the first embodiment, the processing loads on all of the client 2, the authorization server 20 and the resource server 50 may be reduced, compared with a system in which the access token issuing and authentication processing is performed for each data piece.

FIG. 11 is a sequence diagram illustrating an example of a communication according to the first embodiment. FIG. 11 is an example of a communication to be performed after the communication illustrated in FIG. 10 ends. With reference to FIG. 11, advantages will be described which occur when an attribute or the like of a data piece changes because an access token is associated with filter information.

For example, it is assumed that a fact that the agreement status about provision of a drive data piece identified by resource04 to the client 2 with user ID=user01 is changed from "NOT AGREED" to "AGREED" is notified to the authorization server 20. The agreement about provision of the resource may be transmitted from the terminal of the driver (owner04) having performed the driving recorded as drive data to the authorization server 20, for example. The update processing unit 33 in the authorization server 20 obtains a request to change the agreement status through the reception unit 23 and updates the agreement table 43_1 to the agreement table 43_2 in accordance with the request (step S41). The agreement status may be changed in response to input processing performed by an operator of the authorization server 20 when the driver applies to the operator of the authorization server 20 for changing the agreement status about provision of the resource. In this case, in response to the input from an input device (not illustrated) of the authorization server 20, the update processing unit 33 updates the agreement table 43.

It is assumed that the client 2 then transmits a resource request including the access token to the resource server 50 (step S42). It is assumed that the access token to be used in step S42 is the access token notified to the client 2 in step S26 in FIG. 10. The request processing unit 61 in the resource server 50 generates a token verification request including the access token received from the client 2 and transmits it to the authorization server 20 (step S43).

The extraction unit 32 in the authorization server 20 performs the same processing as the processing described in relation to step S28 in FIG. 10 by using the request table 44 (FIG. 9) to determine whether the access token included in the token verification request is valid. It is assumed that the access token is determined as valid. It is assumed that the point in time when the access token is determined as valid is Apr. 22 in 2019.

When the access token is determined as valid, the extraction unit 32 extracts resource IDs of resources satisfying the filter information associated with the access token by using the latest agreement table 43_2 (step S44). In the extraction processing in step S44, the extraction unit 32 performs the same processing as the processing described with reference to step S29 in FIG. 10. First, the extraction unit 32 identifies resource IDs=resource01 to resource04 of resources satisfying the filter information associated with the access token token01. Next, with reference to the agreement table 43_2 (FIG. 8), the extraction unit 32 determines whether the owners of the resources satisfying the filter information agree about the disclosure of the resources. In the agreement table 43_2, the provision of resource01, resource03, and resource04 to the client 2 identified by user ID=user01 has been agreed. Accordingly, the extraction unit 32 includes resource01, resource03 and resource04 in the resource ID list. Therefore, because of the processing in step S44, the resource ID list including resource01, resource03, and resource04 is generated. The extraction unit 32 transmits the generated resource ID list to the resource server 50 (step S45).

When the extraction unit 62 in the resource server 50 obtains the resource ID list received from the authorization server 20, the extraction unit 62 extracts resources associated with the resource IDs in the resource ID list. The extraction unit 62 collectively transmits the extracted resources (data pieces) to the client 2 (step S46). In this example, the extraction unit 62 collectively transmits the drive data pieces identified by resource01, resource03 and resource04 to the client 2.

In the system according to the first embodiment, as described above, because an access token is associated with filter information, the processing of extracting resources satisfying the filter information is performed when the access token is verified. Therefore, as described with reference to FIG. 11, when the agreement status is changed after an access token is issued, the client 2 may collectively obtain a plurality of data pieces based on the latest agreement table 43_2 by using the issued access token.

With reference to FIG. 11, the case has been described where the agreement table 43 is changed after an access token is issued as an example. However, also when another kind of attribute information is changed, extraction by using the attribute information is performed at a point in time when the validity of the access token is confirmed. In other words, for example, by using the issued access token, the client 2 may collectively obtain a plurality of data pieces extracted based on the latest attribute information when the access token is verified. Also when a new data piece is added to the resource server 50, the client 2 may collectively obtain, by using the issued access token, a plurality of data pieces extracted based on the latest attribute information when the access token is verified.

Figure 12A:
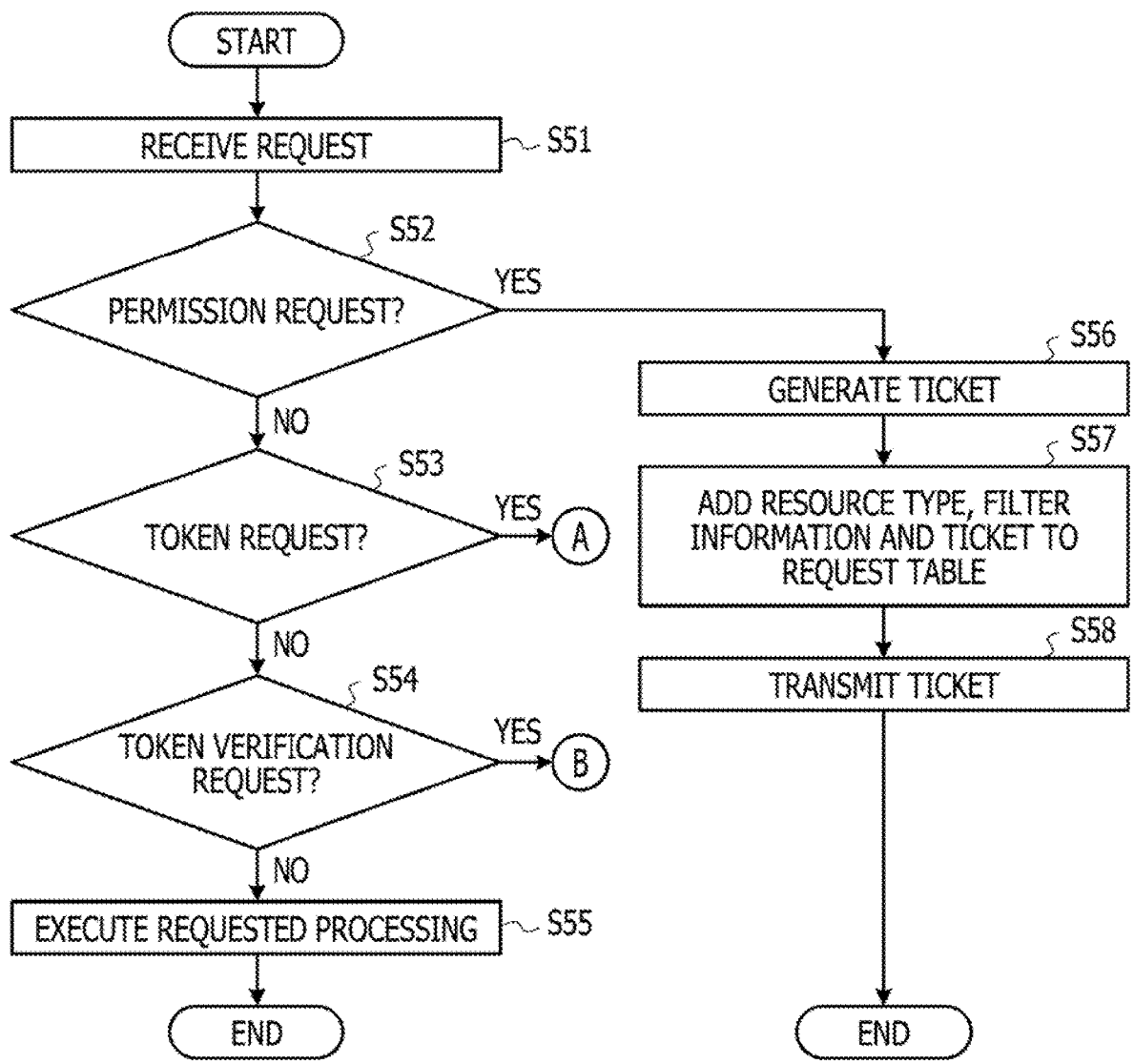
FIG. 12A is a flowchart illustrating an example of processing to be performed in an authorization server.
Figure 12B:
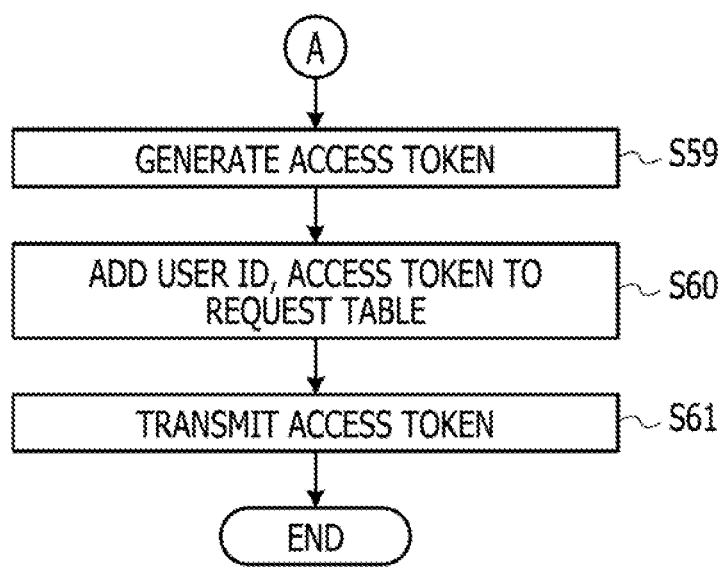
FIG. 12B is a flowchart illustrating an example of processing to be performed in the authorization server.
Figure 12C:
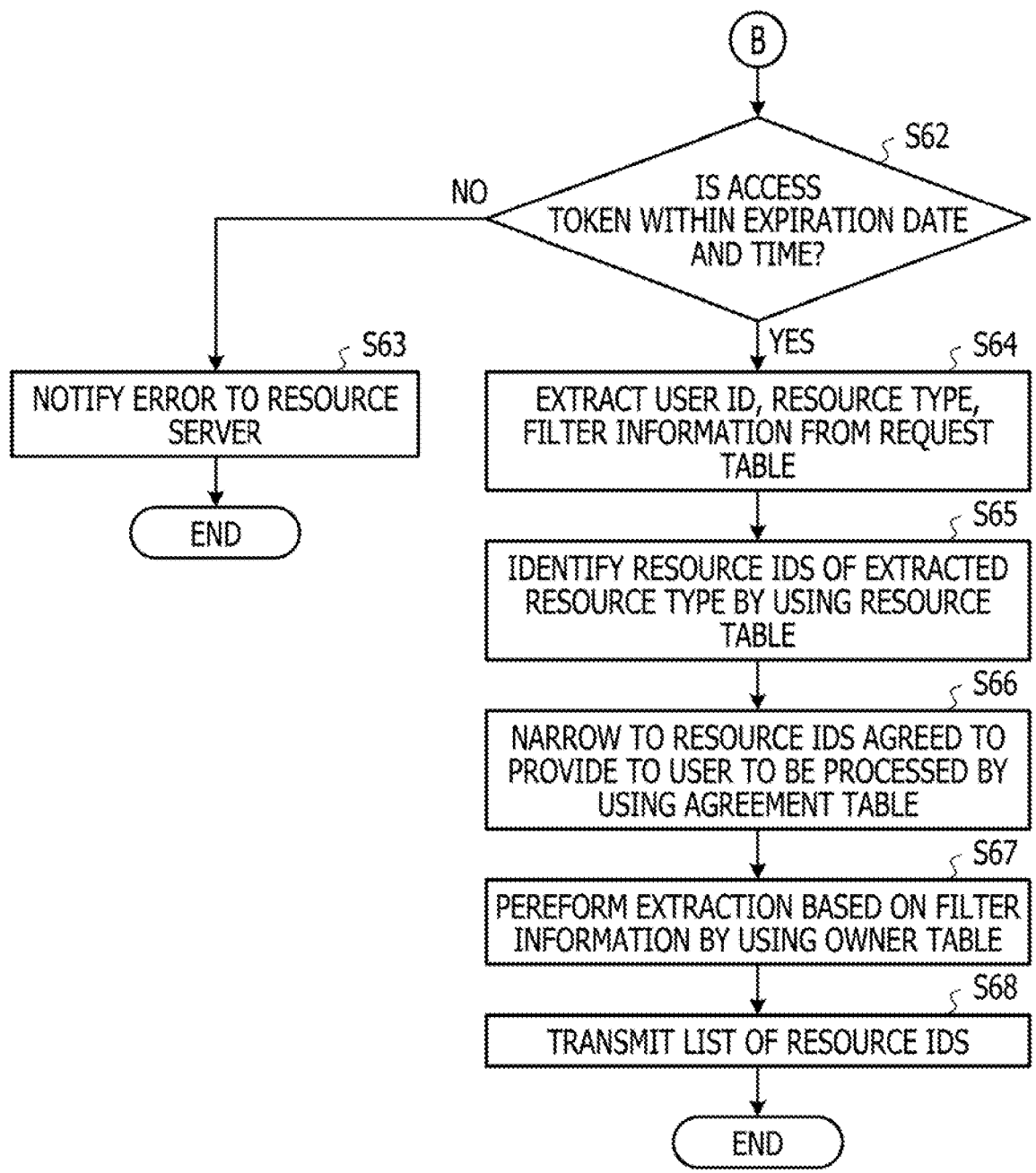
FIG. 12C is a flowchart illustrating an example of processing to be performed in the authorization server.

FIGS. 12A to 12C are flowcharts illustrating an example of processing to be performed in the authorization server 20. The processing in FIG. 12A to 12C is merely an example of processing and the order of the processing may be changed in accordance with the implementation. For example, the order of the processing in step S66 and step S67 may be reversed.

The reception unit 23 receives a request transmitted to the authorization server 20 (step S51). The generation unit 31 determines whether the request is a permission request (step S52). When the request is a permission request (YES in step S52), the generation unit 31 generates a ticket to be used by the client 2 that accesses the authorization server 20 (step S56). The generation unit 31 adds the resource type, the filter information and the ticket to the request table 44 (step S57). The resource type and filter information to be recorded in the request table 44 in step S56 are information notified in the received permission request. The ticket is generated in association with the combination of the resource type and the filter information. The transmission unit 22 then transmits the ticket generated by the generation unit 31 to the resource server 50 as a response to the permission request (step S58).

On the other hand, when the received request is not a permission request (NO in step S52), the generation unit 31 determines whether the request is a token request (step S53). When the request is a token request (YES in step S53), the generation unit 31 generates an access token (step S59). The generation unit 31 adds the user ID and the access token generated in step S59 to the entries including the ticket included in the token request among the entries in the request table 44 (step S60), The user TD is information included in the token request along with the ticket. The transmission unit 22 then transmits the access token generated by the generation unit 31 to the client 2 that is the transmission source of the token request as a response to the token request (step S61).

When the received request is not a permission request and is not a token request (NO in step S53), the extraction unit 32 determines whether the request is a token verification request (step S54). When the received request is not a token verification request (NO in step S54), the update processing unit 33 properly executes the requested processing (step S55).

When the received request is a token verification request (YES in step S54), the extraction unit 32 determines whether the access token included in the token verification request is a token within the expiration date and time (step S62). When the access token is not a token within the expiration date and time, the transmission unit 22 notifies an error to the resource server 50 (NO in step S62, step S63).

When the access token is a token within the expiration date and time (YES in step S62), the extraction unit 32 extracts the user ID, resource type and filter information associated with the access token from the request table 44 (step S64). After that, the extraction unit 32 identifies the resource IDs associated with the extracted resource type by using the resource table 42 (step S65). By using the agreement table 43, the extraction unit 32 narrows the identified IDs to the resource IDs agreed about provision of the resources to the user identified by the user ID to be processed (step S66). The extraction unit 32 generates a list of the resource IDs by performing filtering with the filter information by using the owner table 41 (step S67). After that, the transmission unit 22 transmits the list of the resource IDs to the resource server 50 (step S68).

Figure 13A:
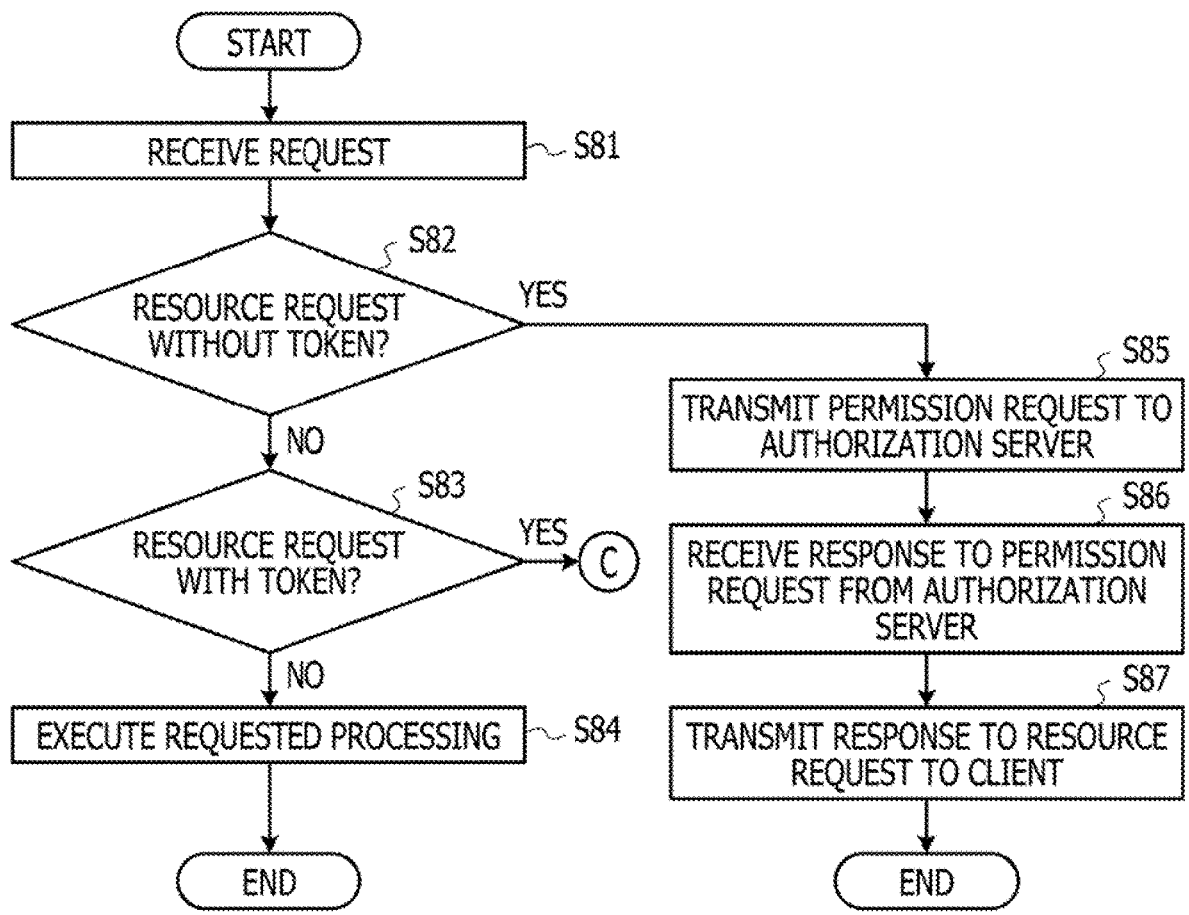
FIG. 13A is a flowchart illustrating an example of processing to be performed in a resource server.
Figure 13B:
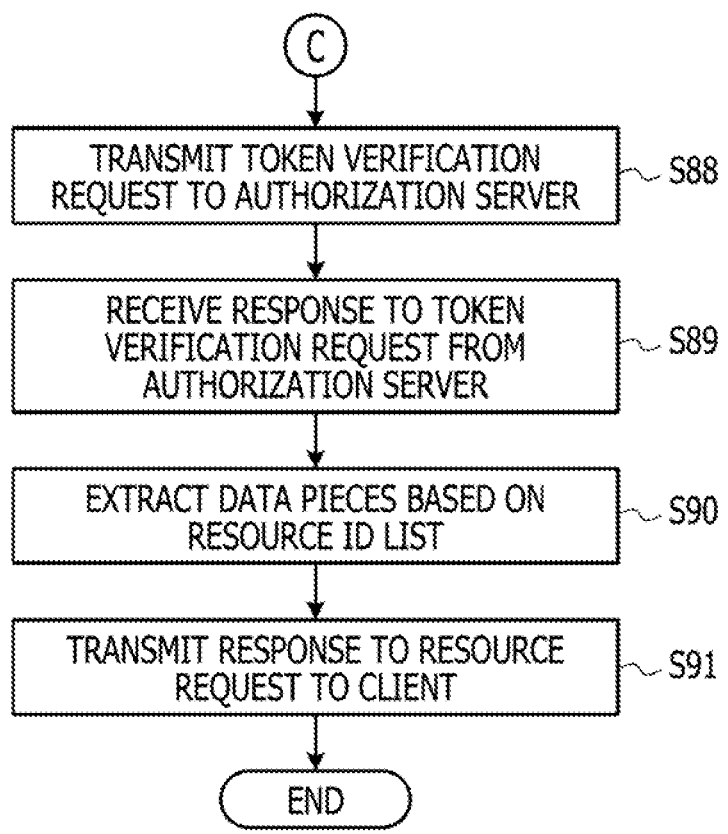
FIG. 13B is a flowchart illustrating an example of processing to be performed in the resource server.

FIGS. 13A and 13B are flowcharts illustrating an example of processing to be performed in the resource server 50. The reception unit 53 receives a request transmitted to the resource server 50 (step S81). The request processing unit 61 determines whether the request is a resource request not including a token (step S82). When the request is a resource request not including a token (YES in step S82), the request processing unit 61 transmits a permission request to the authorization server 20 (step S85). The permission request includes the resource type and the filter information notified in the resource request. The reception unit 53 receives a response to the permission request from the authorization server 20 (step S86). The response to the permission request also includes ticket information to be used by the client 2 for requesting an access token to the authorization server 20. The transmission unit 52 transmits the response to the resource request to the client 2 (step S87). The response to the resource request also includes ticket information to be used by the client 2 for requesting an access token to the authorization server 20.

When the request is not a resource request not including a token and is not a resource request including a token (NO in step S82, NO in step S83), the control unit 60 executes the requested processing (step S84).

When the request is a resource request including a token, the request processing unit 61 generates a token verification request including the access token in the resource request (YES in step S83). The transmission unit 52 transmits the token verification request to the authorization server 20 (step S88). After that, the reception unit 53 receives a response to the token verification request from the authorization server 20 (step S89), When the access token is valid, the response to the token verification request includes information indicating that the access token is valid and the resource ID list. The resource ID list may be used as the information indicating that the access token is valid. In this case, the response to the token verification request may not include the information indicating the validity of the access token other than the resource ID list.

The extraction unit 62 extracts data pieces corresponding to the resource ID list notified from the authorization server 20 (step S90). The extraction unit 62 includes the data pieces obtained by the extraction in a response to the resource request. The transmission unit 52 transmits the response to the resource request to the client 2 (step S91).

According to the first embodiment, as described above, one access token is generated in association with filter information used by one client 2. Thus, the client 2 may collectively obtain, from the resource server 50, data pieces satisfying the filter information. According to the first embodiment, even when addition, change, deletion or the like occurs in the data pieces stored in the resource server 50, the data pieces may be collectively obtained by using the issued access token. Even when the attribute information regarding the data pieces is changed, IDs of data pieces satisfying filter information are extracted in the authorization server 20 in response to the confirmation of the validity of the access token. In other words, for example, without re-issuing an access token even when a change occurs in the attribute information, the data pieces satisfying filter information may be collectively obtained. According to the first embodiment, the loads imposed for obtaining a plurality of data pieces on all of the client 2, the authorization server 20, and the resource server 50 may be reduced, compared with the case where an access token is generated for each of data pieces.

Second Embodiment

According to a second embodiment, an example of a case will be described in which filtering is performed in both of the authorization server 20 and the resource server 50. In the second embodiment, it is assumed that the resource server 50 includes the selection unit 63 and that a filter table 71 and attribute information 72 are stored in the storage unit 70.

FIG. 14 is a diagram illustrating examples of the filter table 71 and the attribute information 72. The filter table 71 includes filter IDs and filter information pieces. Each of the filter information pieces in the filter table 71 is information to be used for filtering in the resource server 50. For example, when the selection unit 63 in the resource server 50 receives a resource request including a filter information piece from the client 2, the selection unit 63 may select an information piece for filtering in the resource server 50 in the filter information and record it in the filter table 71, For the information piece for filtering in the resource server 50, the selection unit 63 generates a filter ID for identifying the information piece and records it in the filter table 71.

The filter table 71 illustrated in FIG. 14 includes a filter information piece "car type=X". A filter ID used for identifying the filter information piece "car type=X" is filter01.

The attribute information 72 is arbitrary information that is associated with an information piece identified by a resource ID of a resource held in the resource server 50 and is usable for filtering on data pieces. In the example in FIG. 14, a resource ID of a resource held in the resource server 50 and a car type used for generating the resource (drive data piece) identified by the resource ID are associated. In an example of the attribute information 72, resource01 and resource04 are drive data pieces with car type=X. resource02 is a drive data piece with car type=Y, and resource03 is a drive data piece with car type=Z.

Figure 15:
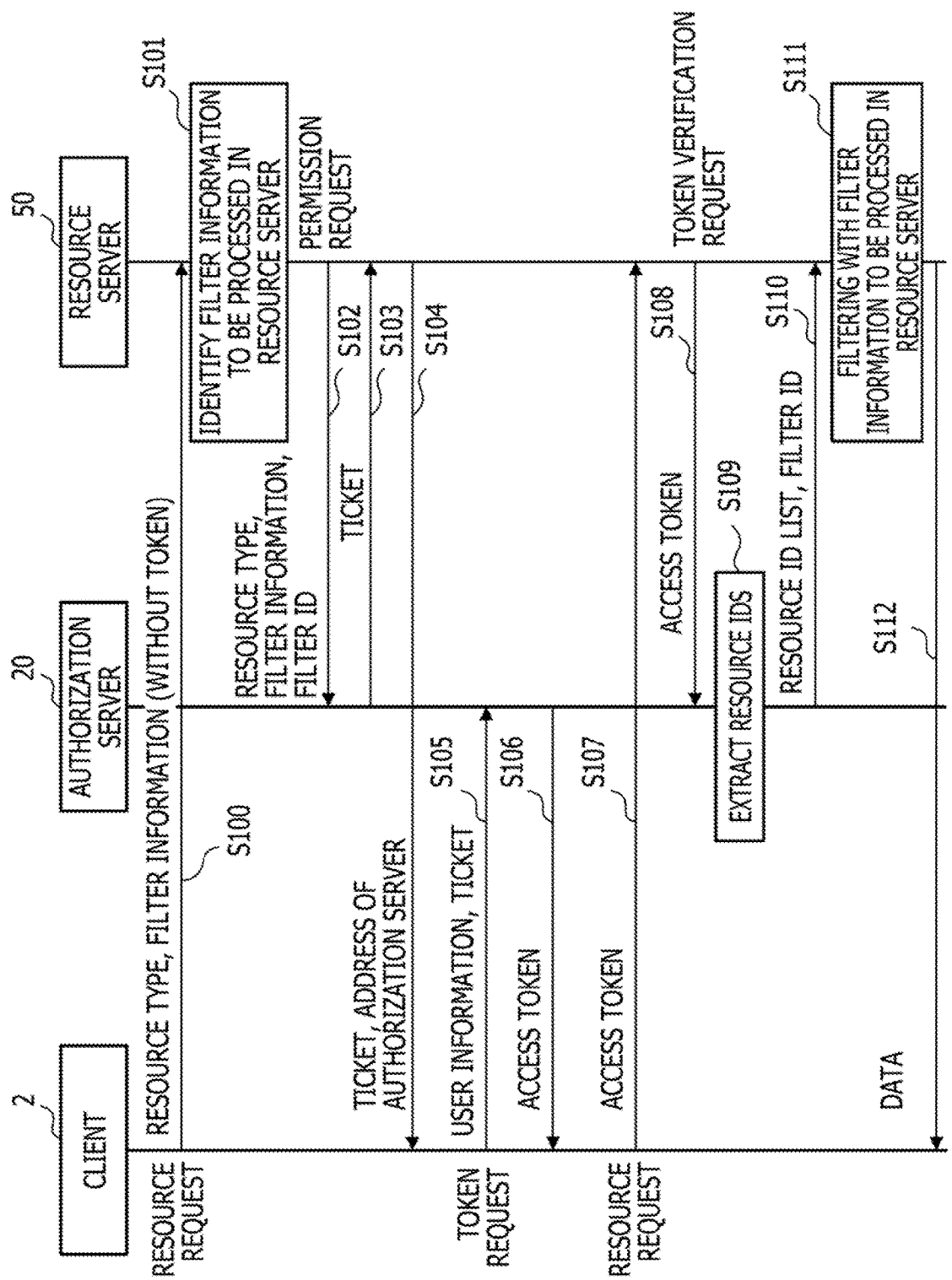
FIG. 15 is a sequence diagram illustrating an example of a communication according to a second embodiment.

FIG. 15 is a sequence diagram illustrating an example of a communication according to the second embodiment. With reference to FIG. 15, collective obtaining of data pieces in a case where the resource server 50 has the attribute information 72 illustrated in FIG. 14 will be described below.

The client 2 to which an access token has not been issued transmits a resource request including a resource type and a filter information piece and not including an access token to the resource server 50 (step S100). The resource request includes information including:
  resource type=drive data,
  filter information=20s or 30, and
  car type=X.

The selection unit 63 in the resource server 50 identifies information pieces of the types registered with the attribute information 72 of the filter information pieces transmitted from the client 2 as filter information pieces to be processed in the resource server 50 (step S101). In this example, the resource server 50 may perform filtering relating to a car type because the attribute information 72 illustrated in FIG. 14 is stored in the resource server 50. Accordingly, the selection unit 63 determines that the filter information piece "car type=X" is to be processed in the resource server 50. The selection unit 63 generates filter01 as a filter ID for identifying the filter information piece "car type=X". Because of the processing in step S101, the filter table 71 illustrated in FIG. 14 is generated.

The request processing unit 61 generates a permission request for requesting a ticket to be used by the client 2 that is the transmission source of the resource request. The permission request includes a resource type, a filter ID and a filter information piece. The filter ID included in the permission request is a filter ID for identifying a filter condition to be processed by the resource server 54. The filter information piece included in the permission request is a filter information piece that is not to be processed by the resource server 50. Therefore, the permission request generated in this example includes information "resource type=drive data", "filter information=20s or 30s" and "filter ID=filter01". The request processing unit 61 transmits the permission request to the authorization sewer 20 through the transmission unit 52 (step S102).

The generation unit 31 in the authorization server 20 obtains the permission request through the reception unit 23, The generation unit 31 generates a ticket in association with the combination of the resource type, the resource ID and the filter information piece included in the permission request. The generation unit 31 records the generated ticket in the request table 44 along with the corresponding combination of the resource type and the filter information. For example, when a ticket ticket01 is generated, the following information is recorded in the request table 44.
  resource type=drive data,
  filter information=20s, 30s,
  filter ID=filter01, and
  ticket=ticket01.

The generation unit 31 includes the generated ticket in a response message to the permission request and transmits it to the resource server 50 (step S103).

The processing in steps S104 and S105 is the same as the processing described with reference to steps S24 and S25 in FIG. 10. Thus, an access token is generated in response to the reception of the token request, and the request table 44 is updated.

FIG. 16 is a diagram illustrating an example of the request table. The example in FIG. 16 assumes that a token request including the following information is transmitted from the client 2, like the first embodiment.
  ticket=ticket01, and
  user ID=user01.

When the generation unit 31 in the authorization server 20 obtains the token request, the generation unit 31 searches entries including ticket01 in the request table 44. At this point in time, the entries including ticket=ticket01 include information including resource type=drive data, filter information=20s, 30s, and filter ID=filter01. It is assumed that the generation unit 31 has issued an access token token01 that is valid until 12:00:00 on Dec. 31, 2019 The generation unit 31 adds the following information to the entries relating to the client 2 having transmitted ticket01.
  user ID=user01,
  access token=token01, and
  expiration date and time=12:00:00, Dec. 31, 2019.

Therefore, the request table 44 is updated as illustrated in FIG. 16. After that, the generation unit 31 transmits the generated access token to the client 2 by including the access token in a response to the token request (step S106 in FIG. 15).

The client 2 having obtained the access token transmits the access token to the resource server 50 to obtain the resources (step S107). The request processing unit 61 in the resource server 50 generates a token verification request including the access token received from the client 2 and transmits it to the authorization server 20 (step S108).

The extraction unit 32 in the authorization server 20 searches through the request table 44 (FIG. 16) by using the access token included in the token verification request as a key. When an entry including the access token to be verified hits, the extraction unit 32 determines whether it is beyond the expiration date and time in the entry. When it is not beyond the expiration date and time, the extraction unit 32 determines that the access token is valid. The extraction unit 32 identifies the filter ID associated with the valid access token. The extraction unit 32 extracts the resource ID of a resource satisfying the filter information piece associated with the valid access token (step S109). The resource ID extraction processing is the same as that in the first embodiment. The extraction unit 32 records the extracted resource ID in a resource ID list.

After that, the extraction unit 32 transmits the generated resource ID list and the filter ID associated with the access token to the resource server 50 (step S110). It is assumed that resource01, resource03 and resource04 are recorded in the resource ID list. The filter ID transmitted along with the resource ID list is filter01.

The extraction unit 62 in the resource server 50 further filters the resource IDs in the resource ID list received from the authorization server 20 by using the filter information piece to be processed by the resource server 50 (step S111). In this case, the extraction unit 62 identifies the filter information piece to be used for the filtering by searching through the filter table 71 by using the filter ID as a key. After that, the extraction unit 62 searches through the attribute information 72 by using the identified filter condition and thus extracts resource IDs satisfying the condition identified by the filter ID notified from the authorization server 20 among the resource IDs included in the resource ID list.

For example, in step S110, because filter ID=filter01 is notified, the extraction unit 62 identifies the filter information piece "car type=X" by searching through the filter table 71 (refer to FIG. 14). Accordingly, the extraction unit 62 determines whether each of the resource IDs included in the resource ID list obtained from the authorization server 20 satisfies the filter information piece with reference to the attribute information 72 (refer to FIG. 14). In this example, resource01, resource03 and resource04 are recorded in the resource ID list. When the extraction unit 62 recognizes that resource01 is associated with car type=X by using the first entry of the attribute information 72, the extraction unit 62 determines resource01 as the ID of the resource to be transmitted to the client 2. Also with respect to resource04, the extraction unit 62 recognizes that resource04 is associated with car type=X by using the fourth entry of the attribute information 72. The extraction unit 62 determines resource04 as the ID of the resource to be transmitted to the client 2. On the other hand, resource03 is associated with car type=Z in the third entry of the attribute information 72. Accordingly, the extraction unit 62 excludes resource03 from the IDs of the resources to be transmitted to the client 2. Therefore, in this example, the extraction unit 62 extracts resource01 and resource04 as the IDs of the resources to be transmitted to the client 2. The extraction unit 62 collectively transmits the resources (data pieces) corresponding to the extracted resource IDs to the client 2 (step S112).

In this manner, according to the second embodiment, because filtering is performed also in the resource server 50, the load due to the extraction processing may be distributed to the authorization server 20 and the resource server 50.

Figure 17A:
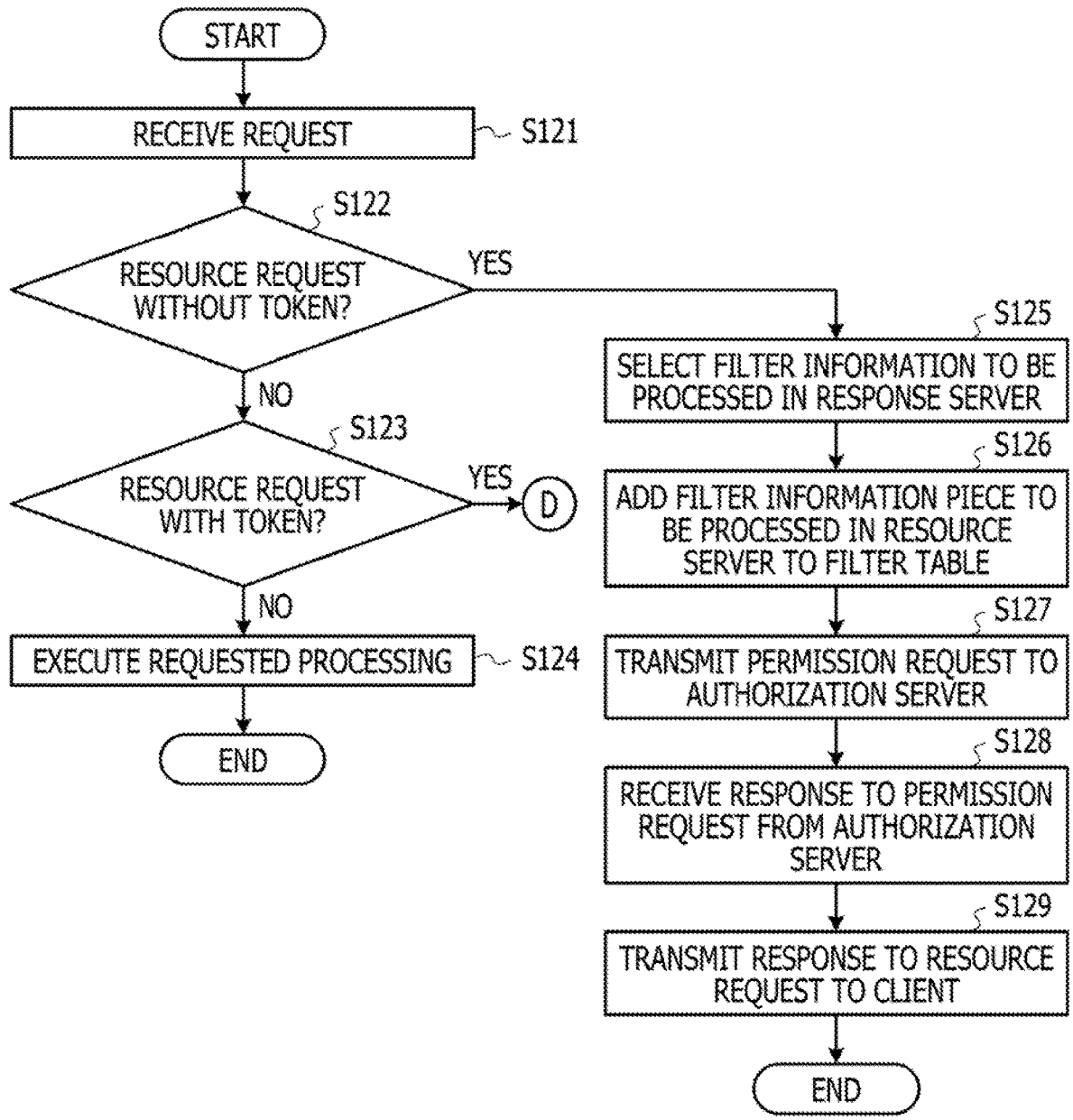
FIG. 17A is a flowchart illustrating an example of processing to be performed in a resource server.
Figure 17B:
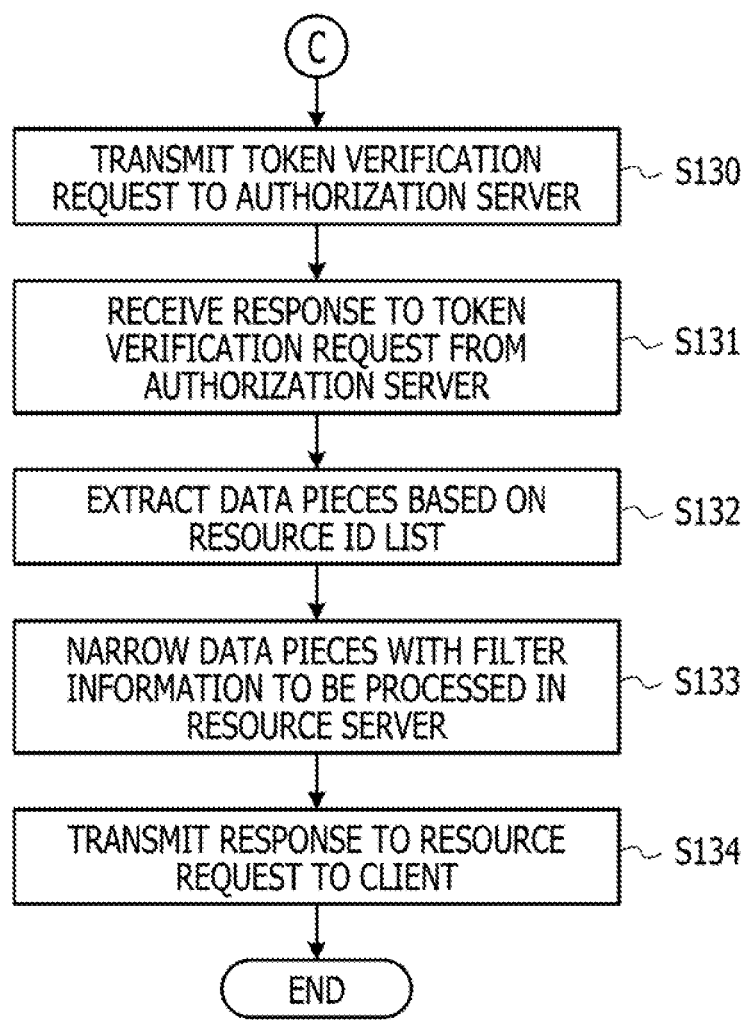
FIG. 17B is a flowchart illustrating an example of processing to be performed in the resource server.

FIGS. 17A and 17B are flowcharts illustrating an example of processing to be performed in the resource server. FIGS. 17A and 17B are an example of the processing, and the order of the processing, for example, may be changed in accordance with the implementation. For example, the order of the processing in step S132 and step S133 may be reversed.

The reception unit 53 receives a request transmitted to the resource server 50 (step S121). The request processing unit 61 determines whether the request is a resource request not including a token (step S122) When the request is a resource request not including a token (YES in step S122), the selection unit 63 selects a filter information piece to be processed in the resource server 50 from the filter information included in the request (step S125). The selection unit 63 adds the filter information piece to be processed in the resource server 50 to the filter table 71 (step S126). In this case, the selection unit 63 also generates a filter ID for identifying the filter information piece to be processed in the resource server 50 and records it in the filter table 71. After that, the request processing unit 61 transmits a permission request to the authorization server 20 (step S127). The permission request includes a resource type, a filter ID, and a filter information piece not to be processed in the resource server 50 in the filter information included in the resource request. The processing in steps S128 and S129 is the same as the processing in steps S86 and S87 described with reference to FIG. 13A.

When the request is not a resource request not including a token and is not a resource request including a token (NO in step S122, NO in step S123), the control unit 60 executes the requested processing (step S124).

When the request is a resource request including a token, the request processing unit 61 generates a token verification request including the access token included in the resource request (YES in step S123). The transmission unit 52 transmits the token verification request to the authorization server 20 (step S130). After that, the reception unit 53 receives a response to the token verification request from the authorization server 20 (step S131). When the access token is valid, the response to the token verification request includes information indicating that the access token is valid, the resource ID list, and the filter ID. The resource ID list may be used as the information indicating that the access token is valid, like the first embodiment. In this case, the response to the token verification request may not include the information indicating the validity of the access token other than the resource ID list.

The extraction unit 62 extracts data pieces corresponding to the resource ID list notified from the authorization server 20 (step S132). The extraction unit 62 further narrows the data pieces obtained by the extraction processing in step S132 by using the filter information piece identified by the filter ID notified from the authorization server 20 (step S133). The filter information piece identified by the filter ID notified from the authorization server 20 is a filter information piece to be processed in the resource server 50. The extraction unit 62 includes the data pieces acquired by the narrowing by using the filter information piece identified by the filter ID notified from the authorization server 20 in the response to the resource request. The transmission unit 52 transmits the response to the resource request to the client 2 (step S134).

The operations by the authorization server 20 according to the second embodiment involve the processing that is the same as the processing described with reference to FIGS. 12A to 12C, excluding the processing relating to a filter ID. According to the second embodiment, the authorization server 20 records the filter ID notified from the resource server 50 in the request table 44 in addition to the resource type, the filter information piece and the ticket when updating the request table 44 in step S57 in FIG. 12A. According to the second embodiment, the authorization server 20 transmits the resource ID list and the filter ID to the resource server 50 when transmitting the resource ID list to the client 2 in step S68 in FIG. 12C.

According to the second embodiment, the load due to the extraction processing may be distributed to the authorization server 20 and the resource server 50, and different types of information are to be processed by the servers so that the authorization server 20 may be generically used. For example, personal information such as the age or sex of a provider of a resource may be stored in the authorization server 20, and information usable for limitation of resources based on a resource type held in each of the resource severs 50 may be stored in the resource server 50. The information usable for limitation of resources based on a resource type held by the resource server 50 may be determined based on the resource types. For example, for the resource server 50 holding drive data, information such as car types or areas where driving is performed may be the information usable for limitation of resources. In this manner, by the filtering of the information usable for limitation based on a resource type in the resource server 50, the authorization server 20 may be specified to authorization of accesses to various resource servers 50 and filtering using personal information. The authorization server 20 is generically usable for one or more resource servers 50 holding various resource types.

<Others>

The embodiments are not limited to the above and may be variously modified. Some examples thereof will be described below.

In the description above, the case has been described, as an example, in which a plurality of resources are extracted as resources to be notified to the client 2. However, the number of resources to be notified to the client 2 is an arbitrary number equal to or higher than 1.

The information pieces in the tables described above are examples, and these pieces of information may also be changed in accordance with the implementation. For example, the owner table 41, the resource table 42, the agreement table 43, and the request table 44 may be united to one table or may be divided into an arbitrary number.

The number and types of information pieces to be included in the filter information to be notified from the client 2 to the resource server 50 are arbitrary. For example, in both of the first and second embodiments, sex, for example, may be included in the filter information.

Also in the second embodiment, the attribute information held by the authorization server 20 and the information held by the resource server 50 may be changed after an access token is issued. Also in this case, like the first embodiment, the extraction processing is performed by using the latest attribute information at the point in time when the access token is determined as valid.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An authorization apparatus of controlling whether to authorize an access to a data server from a terminal, the authorization apparatus comprising:
   a memory configured to store, for each data record of a plurality of data records stored in the data server, attribute information and to store request information, the attribute information for the each data record including resource identification information and a plurality of pieces of information indicating a plurality of attributes of the each data record, the plurality of attributes including an owner identification information and one or more attributes of an owner of the each data record, the owner identification information including an identifier of the owner of the each data record, the request information including a user identification information and an extraction condition information, the user identification including an identifier of a user of the terminal, the extraction condition information including an extraction condition that is a condition to be used for extracting, from among the plurality of data records, the data record to be obtained by the terminal, the owner of the each data record being a person different from the user of the terminal; and
   a processor circuit coupled to the memory, the processor circuit being configured to perform processing, the processing including:
   receiving a first request from the terminal, the first request including the user identification information;
   in response to the receiving of the first request,
      generating, for the terminal to be authorized to access the data server, an access token, to store the generated access token in association with the extraction condition information by adding the generated access token to the request information that includes the user identification included in the first request, and
      transmitting a first response to the terminal, the first response including the generated access token;
   receiving, from the data server, a second request including a target access token associated with an access request from the terminal to the data server; and
   in response to the receiving of the second request,
      obtaining, from the memory, the request information that includes the generated access token matching the target access token included in the second request,
      obtaining, from the obtained request information, the extraction condition information that corresponds to the access token that matches the target access token,
      extracting, from among a plurality of pieces of attribute information stored for the plurality of data records, one or more pieces of resource identification information, the extracting of the one or more pieces of resource identification information including comparing, for each data record of the plurality of data records, the one or more attributes of the owner of the each data record and the extraction condition included in the obtained extraction condition information, extracting the one or more pieces of attribute information each of which includes the one or more attributes that satisfy the extraction condition included in the obtained extraction condition information, and obtaining, from each of the extracted one or more pieces of attribute information, the resource identification information, and transmitting a second response to the data server, the second response including a list of the extracted one or more pieces of resource identification information, each of the one or more pieces of resource identification information indicating to the data server from among the plurality of data records a data record to be allowed to be provided to the terminal.

2. The authorization apparatus according to claim 1, wherein
the authorization apparatus is able to control whether to authorize an access to a data server from each terminal of a plurality of terminals.

3. The authorization apparatus according to claim 1, wherein
when receiving the access token, which is generated before the attribute information is updated, as the target access token after the attribute information is updated, the processor circuit generates the list by extracting the one or more pieces of resource identification information from the attribute information after the update.

4. A data server comprising:
a memory configured to store a plurality of data records, each of the plurality of data records including data in association with resource identification information of the data; and
a processor circuit coupled to the memory, the processor being configured to perform processing, the processing including:
receiving a first request from a terminal, the first request including user identification information and extraction condition information, the user identification including an identifier of a user of the terminal, the extraction condition information including an extraction condition that is a condition to be used for extracting, from among the plurality of data records, a data record to be obtained by the terminal;
in response to the receiving of the first request, transmitting a signal including the user identification information and the extraction condition information to an authorization apparatus, the transmitting of the signal causing the authorization apparatus to store request information including the user identification information and the extraction condition information, thereby a memory of the authentication apparatus stores, for each data record of the plurality of data records stored in the data server, attribute information and to store the request information, the attribute information for the each data record including resource identification information and a plurality of pieces of information indicating a plurality of attributes of the each data record, the plurality of attributes including an owner identification information and one or more attributes of an owner of the each data record, the owner identification information including an identifier of the owner of the each data record, the owner of the each data record being a person different from the user of the terminal;
receiving a second request from the terminal, the second request including an access token that has been generated by the authorization apparatus;

in response to the receiving of the second request, transmitting a verification request including the access token to the authorization apparatus, the transmitting of the verification request causing the authorization apparatus to perform
obtaining, from the memory, the request information corresponding to the access token included in the verification request,
obtaining, from the obtained request information, the extraction condition information that corresponds to the access token,
extracting, from among a plurality of pieces of attribute information stored for the plurality of data records, one or more pieces of resource identification information, the extracting of the one or more pieces of resource identification information including comparing, for each data record of the plurality of data records, the one or more attributes of the owner of the each data record and the extraction condition included in the obtained extraction condition information, extracting the one or more pieces of attribute information each of which includes the one or more attributes that satisfy the extraction condition included in the obtained extraction condition information, and obtaining, from each of the extracted one or more pieces of attribute information, the resource identification information, and
transmitting a response to the data server, the response including a list of the extracted one or more pieces of resource identification information, each of the one or more pieces of resource identification information indicating to the data server from among the plurality of data records a data record to be allowed to be provided to the terminal; and
transmitting, in response to receiving the response from the authentication apparatus, data associated with the one or more pieces of resource identification information included in the list to the terminal.

5. The data server according to claim 4,
the processing further including:
in response to the transmitting of the signal, receiving, from the authentication apparatus, ticket information to be used for accessing the authorization apparatus by the terminal; and
transmitting the ticket information to the terminal.

6. The data server according to claim 5, wherein
the extraction condition information includes a plurality of extraction conditions, and
the transmitting of the signal includes
selecting, from among the plurality of extraction conditions, one or more extraction conditions, and
transmitting the signal including the selected one or more extraction conditions to the authorization apparatus.

7. A communication system comprising:
a data server configured to store a plurality of data records, each of the plurality of data records including data in association with resource identification information of the data;
a terminal configured to request to the data server; and
an authorization apparatus of controlling whether to authorize an access to the data server from the terminal, the authorization apparatus including:
a memory configured to store, for each data record of a plurality of data records stored in the data server, attribute information and to store request information, the attribute information for the each data record including the resource identification information and a plurality of pieces of information indicating a plurality of attributes of the each data record, the plurality of attributes including an owner identification information and one or more attributes of an owner of the each data record, the owner identification information including an identifier of the owner of the each data record, the request information including a user identification information and an extraction condition information, the user identification including an identifier of a user of the terminal, the extraction condition information including an extraction condition that is a condition to be used for extracting, from among the plurality of data records, the data record to be obtained by the terminal, the owner of the each data record being a person different from the user of the terminal; and a processor circuit coupled to the memory, the processor circuit being configured to perform processing, the processing including:

receiving a first request from the terminal, the first request including the user identification information;

in response to the receiving of the first request, generating, for the terminal to be authorized to access the data server, an access token, to store the generated access token in association with the extraction condition information by adding the generated access token to the request information that includes the user identification included in the first request, and transmitting a first response to the terminal, the first response including the generated access token;

receiving, from the data server, a second request including a target access token associated with an access request from the terminal to the data server; and in response to the receiving of the second request, obtaining, from the memory, the request information that includes the generated access token matching the target access token included in the second request, obtaining, from the obtained request information, the extraction condition information that corresponds to the access token that matches the target access token, extracting, from among a plurality of pieces of attribute information stored for the plurality of data records, one or more pieces of resource identification information, the extracting of the one or more pieces of resource identification information including comparing, for each data record of the plurality of data records, the one or more attributes of the owner of the each data record and the extraction condition included in the obtained extraction condition information, extracting the one or more pieces of attribute information each of which includes the one or more attributes that satisfy the extraction condition included in the obtained extraction condition information, and obtaining, from each of the extracted one or more pieces of attribute information, the resource identification information, and transmitting a second response to the data server, the second response including a list of the extracted one or more pieces of resource identification information, each of the one or more pieces of resource identification information indicating to the data server from among the plurality of data records a data record to be allowed to be provided to the terminal.

* * * * *